US012462731B2

(12) United States Patent
Zhang

(10) Patent No.: US 12,462,731 B2
(45) Date of Patent: Nov. 4, 2025

(54) CASCADED GATE ON ARRAY (GOA) DISPLAY PANEL IMPROVING PROBLEM OF EXCESSIVELY LARGE DISPLAY FRAME

(71) Applicant: WUHAN CHINA STAR OPTOELECTRONICS SEMICONDUCTOR DISPLAY TECHNOLOGY CO., LTD., Wuhan (CN)

(72) Inventor: Huanxi Zhang, Wuhan (CN)

(73) Assignee: WUHAN CHINA STAR OPTOELECTRONICS SEMICONDUCTOR DISPLAY TECHNOLOGY CO., LTD., Wuhan (CN)

(*) Notice: Subject to any disclaimer, the term of this patent is extended or adjusted under 35 U.S.C. 154(b) by 0 days.

(21) Appl. No.: 18/283,023

(22) PCT Filed: Aug. 18, 2023

(86) PCT No.: PCT/CN2023/113780
§ 371 (c)(1),
(2) Date: Sep. 20, 2023

(87) PCT Pub. No.: WO2025/020243
PCT Pub. Date: Jan. 30, 2025

(65) Prior Publication Data

US 2025/0037641 A1 Jan. 30, 2025

(30) Foreign Application Priority Data

Jul. 26, 2023 (CN) ......................... 202310929106.9

(51) Int. Cl.
*G09G 3/32* (2016.01)
*G09G 3/3266* (2016.01)

(52) U.S. Cl.
CPC ............ *G09G 3/32* (2013.01); *G09G 3/3266* (2013.01); *G09G 2300/0842* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS 12,307,979 B2 * 5/2025 Zhang .................. G09G 3/3266
12,327,527 B2 * 6/2025 Zhang .................. G09G 3/3233
(Continued)

FOREIGN PATENT DOCUMENTS

CN 113785352 A 12/2021
CN 115482773 A 12/2022
(Continued)

OTHER PUBLICATIONS

PCT International Search Report for International Application No. PCT/CN2023/113780, mailed on Apr. 22, 2024, 12pp.
(Continued)

*Primary Examiner* — Ke Xiao
*Assistant Examiner* — Nelson Lam
(74) *Attorney, Agent, or Firm* — The Roy Gross Law Firm, LLC; Roy D. Gross

(57) ABSTRACT

The present application discloses a display panel, which includes N GOA units disposed along a first direction. Each GOA unit includes a first output module, a signal generation module, and a second output module disposed along a second direction. The first output module is configured to output a first gate driving signal, and the second output module is configured to output a second gate driving signal. The first gate driving signal is different from the second gate
(Continued)

driving signal, and a length of the first output module is different from a length of the second output module.

17 Claims, 20 Drawing Sheets

(52) U.S. Cl.
CPC ............... *G09G 2310/0267* (2013.01); *G09G 2310/0291* (2013.01); *G09G 2310/08* (2013.01)

(58) Field of Classification Search
CPC .. G09G 3/3233; G09G 3/3241; G09G 3/3258; G09G 3/3266; G09G 3/3275; G09G 3/3283; G09G 3/3291; G09G 2310/0291
USPC ........................................................ 345/76–83
See application file for complete search history.

(56) References Cited

U.S. PATENT DOCUMENTS

| | | | | |
|---|---|---|---|---|
| 2006/0022201 | A1* | 2/2006 | Kim | G02F 1/1339 438/151 |
| 2011/0043511 | A1* | 2/2011 | Hsueh | G09G 3/3677 345/212 |
| 2012/0105397 | A1* | 5/2012 | Tan | G09G 3/3677 377/64 |
| 2013/0222357 | A1* | 8/2013 | Tseng | G09G 3/20 345/212 |
| 2014/0055442 | A1* | 2/2014 | Hsu | G09G 3/3677 345/212 |
| 2014/0062847 | A1* | 3/2014 | Chien | G11C 19/28 345/100 |
| 2014/0198022 | A1* | 7/2014 | Chou | G09G 3/3677 345/92 |
| 2015/0042549 | A1* | 2/2015 | Hu | G09G 3/3677 345/96 |
| 2016/0049126 | A1* | 2/2016 | Zhang | G06F 3/0416 377/64 |
| 2016/0189794 | A1* | 6/2016 | Lou | G09G 3/3266 345/100 |
| 2018/0151139 | A1 | 5/2018 | Yi et al. | |
| 2019/0043405 | A1* | 2/2019 | Noh | G09G 3/3674 |
| 2021/0056880 | A1* | 2/2021 | Mou | G11C 19/28 |
| 2022/0319410 | A1* | 10/2022 | Yu | H10D 86/441 |
| 2022/0343854 | A1* | 10/2022 | Li | G11C 19/28 |

FOREIGN PATENT DOCUMENTS

| | | | |
|---|---|---|---|
| CN | 115831033 | A | 3/2023 |
| CN | 115938324 | A | 4/2023 |
| EP | 4113497 | A1 | 1/2023 |
| WO | 2022160086 | A1 | 8/2022 |
| WO | 2023044830 | A1 | 3/2023 |
| WO | 2023122980 | A1 | 7/2023 |
| WO | 2023133826 | A1 | 7/2023 |

OTHER PUBLICATIONS

PCT Written Opinion of the International Searching Authority in International application No. PCT/CN2023/113780, mailed on Apr. 22, 2024, 7pp.

German Office Action issued in corresponding German Patent Application No. 11 2023 000 099.9 dated Apr. 30, 2024, pp. 1-8, 14pp.

* cited by examiner

CASCADED GATE ON ARRAY (GOA) DISPLAY PANEL IMPROVING PROBLEM OF EXCESSIVELY LARGE DISPLAY FRAME

CROSS REFERENCE TO RELATED APPLICATIONS

This application is a US national phase application based upon an International Application No. PCT/CN2023/113780, filed on Aug. 18, 2023, which claims priority to Chinese Patent Application No. 202310929106.9, filed on Jul. 26, 2023, and entitled "DISPLAY PANEL". The entire disclosures of the above application are incorporated herein by reference.

TECHNICAL FIELD

The present application relates to the field of display technology, in particular to a display panel.

BACKGROUND

OLED (Organic Light-Emitting Diode) display technology is a new type of display technology, which has gradually attracted people's attention due to its unique advantages such as low power consumption, high saturation, fast response time, and wide viewing angle, occupying a certain position in the field of panel display technology.

In the related art, a pixel driving circuit of an OLED display panel is usually an 8T2C circuit. For the pixel driving circuit, a complementary metal oxide semiconductor (CMOS) gate driving circuit (Gate On Array, GOA) is currently proposed to solve the technical problem of high power consumption of conventional gate driving circuits.

The CMOS GOA circuit needs to generate two kinds of gate driving signals, Nout and Pout, therefore, the gate driving circuit is provided with two buffer parts corresponding to Nout and Pout respectively. Existing signal generation parts are usually located close to a frame. The buffer part is usually disposed close to a display area. Two buffer parts may overlap vertically. In the case that each stage of GOA unit has a limited longitudinal size, a vertical size of the two buffer parts may become smaller. In order to ensure a performance of transistors in Nout and Pout, it is necessary to increase a size of the buffer part in a horizontal direction. It is necessary to reserve a wider area on the frame of the product to set up the gate driving circuit, which is contrary to a narrow frame design of the product.

SUMMARY OF INVENTION

The present application provides a display panel to improve the technical problem of excessively large frames of existing display devices.

In order to solve the above-mentioned solution, the technical solution provided by the application is as follows:

The present application provides a display panel comprising a display part and a gate driving circuit located on a side of the display part, wherein the gate driving circuit comprises N cascaded GOA units, and the N GOA units are disposed along a first direction; wherein each of the GOA units comprises a signal generation module, a first output module, and a second output module disposed along a second direction;

wherein the first output module is disposed on a side of the signal generation module close to the display part, and the first output module is configured to output a first gate driving signal;

wherein the second output module is disposed on a side of the signal generation module away from the display part, the second output module is configured to output a second gate driving signal, and the first gate driving signal is different from the second gate driving signal; and wherein in the second direction, lengths of the first output module and the second output module are different, the second direction is parallel to scan lines of the display panel, an angle between the first direction and the second direction is greater than 0° and less than or equal to 90°, and N is a positive integer.

DETAILED DESCRIPTION OF ILLUSTRATED EMBODIMENTS

Figure 1:
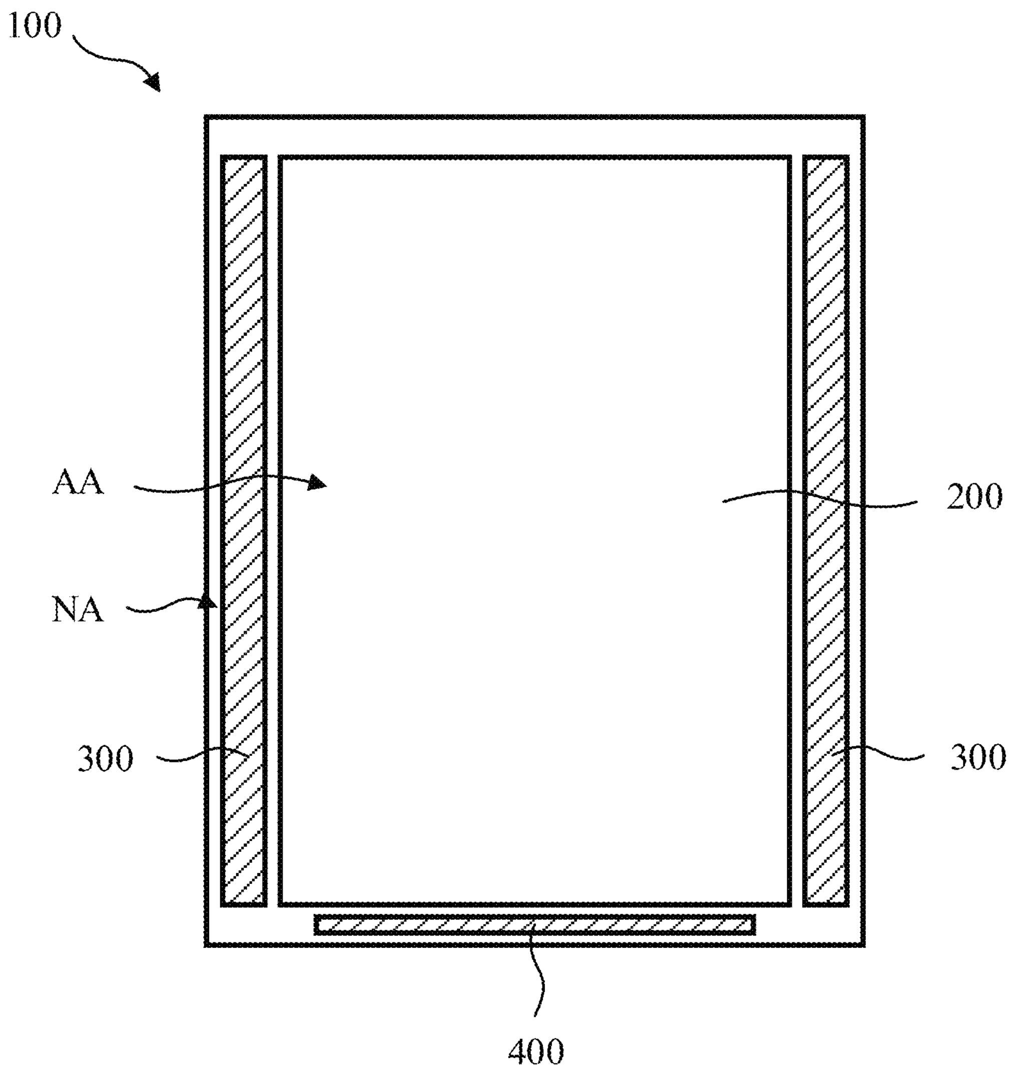
FIG. 1 is a schematic structural diagram of a display panel of the present application.

The technical solutions in the embodiments of the present application will be clearly and completely described below in conjunction with the drawings in the embodiments of the present application. Apparently, the described embodiments are only some of the embodiments of this application, not all of them. Based on the embodiments in this application, all other embodiments obtained by those skilled in the art without making creative efforts belong to the scope of protection of this application. In addition, it should be understood that the specific implementations described here are only used to illustrate and explain the present application and are not intended to limit the present application. In this application, unless stated otherwise, the used orientation words such as "up" and "down" generally refer to up and down in the actual use or working state of the device. Specifically, it is the orientation in the drawings. The "inside" and "outside" refer to the outline of the installation.

In related OLED display panels, a CMOS gate driving circuit is usually used to solve the technical problem of high power consumption of conventional gate driving circuits. The CMOS GOA circuit needs to generate two kinds of gate driving signals, Nout and Pout, therefore, the gate driving circuit is provided with two buffer parts corresponding to Nout and Pout respectively. In contrast, existing signal generation parts are usually located close to the frame. The buffer part is usually disposed close to a display area, resulting in a wider area reserved on the frame of the product to set the buffer part, which is contrary to a narrow frame design of the product. The present application proposes the following solutions based on the above technical problems.

Referring to FIG. 1 to FIG. 21, the present application provides a display panel 100. The display panel 100 may include a display part 200 and a gate driving circuit 300 located at one side of the display part 200. The gate driving circuit 300 includes N cascaded GOA units 310, and the N GOA units 310 are disposed along a first direction X.

In this embodiment, each GOA unit 310 includes a signal generation module 10, a first output module 20, and a second output module 30 disposed along a second direction Y. The first output module 20 is disposed on a side of the signal generation module 10 close to the display unit 200. The first output module 20 is configured to output a first gate driving signal. The second output module 30 is disposed on a side of the signal generation module 10 away from the display unit 200. The second output module 30 is configured to output a second gate driving signal. The first gate driving signal is different from the second gate driving signal.

In this embodiment, in the second direction Y, lengths of the first output module 20 and the second output module 30 are different. The second direction Y is parallel to scan lines of the display panel 100, the first direction X is perpendicular to the second direction Y, and N is a positive integer.

Figure 2:
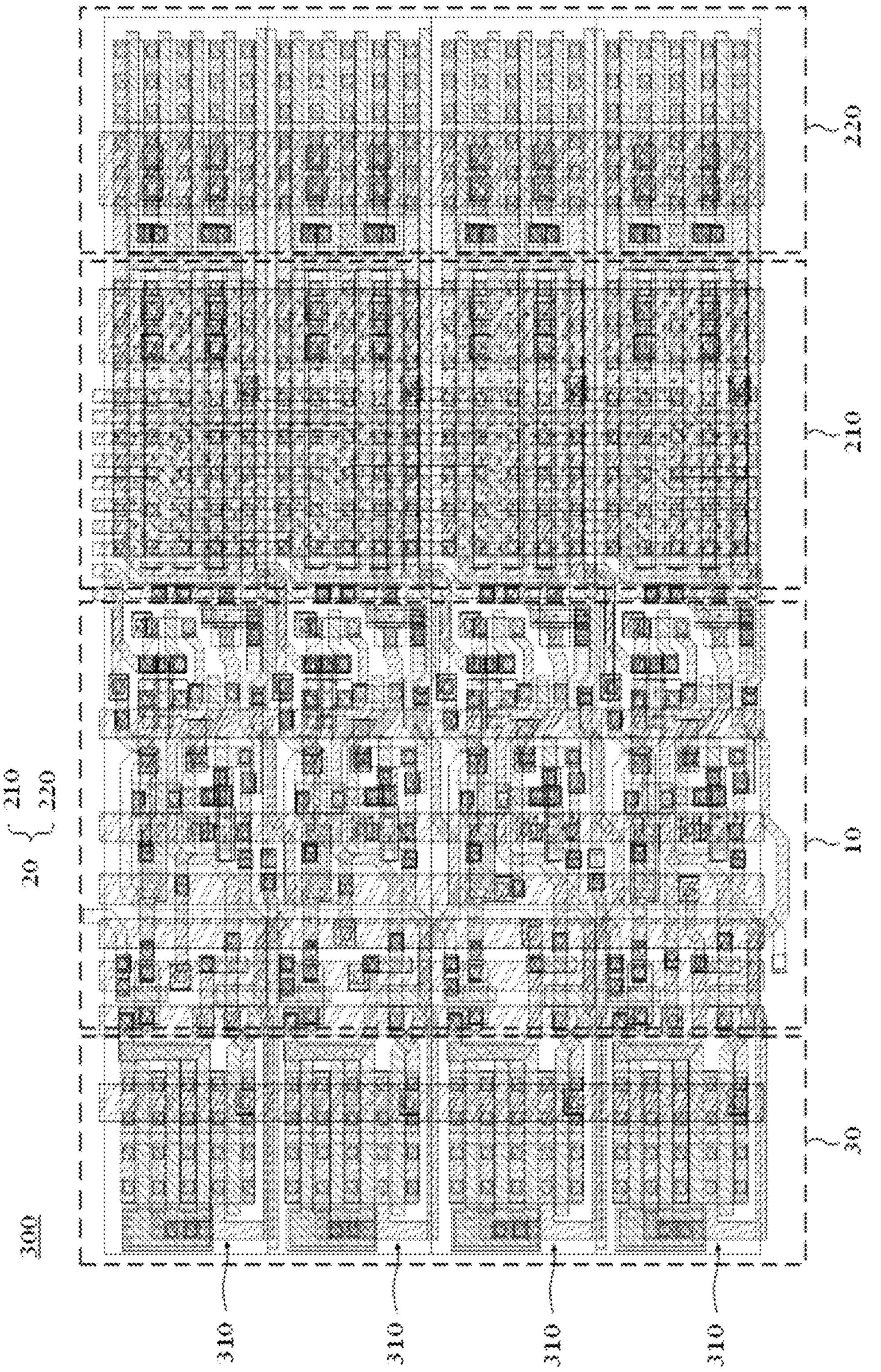
FIG. 2 is a schematic structural diagram of a gate driving circuit in a display panel of the present application.

In this embodiment, an angle between the first direction X and the second direction Y is greater than 0° and less than or equal to 90°. Referring to FIG. 2, the second direction Y may be perpendicular to the first direction X.

In the present application, two output modules outputting different gate driving signals and having different lengths are disposed on both sides of the signal generation module 10. This makes the two output modules have sufficient width in the first direction X, which ensures the performance of transistors in the two output modules. This avoids the technical problem of increased frames caused by two output modules being stacked on the same side and realizes a narrow frame design.

It should be noted that the first gate driving signal is a positive pulse signal, and the second gate driving signal is a negative pulse signal. Within a time interval of one frame, the first signal output terminal Nout outputs two positive pulse signals, and the second signal output terminal Pout outputs one negative pulse signal. A pulse width of one positive pulse signal is greater than a pulse width of one negative pulse signal.

The CMOS GOA circuit of the present application needs to output the first gate driving signal and the second gate driving signal. The pulse width of the first gate driving signal is greater than the pulse width of the second gate driving signal. That is, an output load of the first output module 20 is greater than an output load of the second output module 30. Therefore, a width of the first output module 20 of the present application may be greater than a width of the second output module 30, so that the first output module 20 has a larger buffer space and has a larger output load capacity.

It should be noted that a low temperature polysilicon semiconductor has a large leakage current, and a metal oxide transistor has a small leakage current. Therefore, in order to reduce a leakage current of the first output module 20, the present application may set the transistors in the first output module 20 as a combination of low temperature polysilicon transistors and metal oxide transistors.

Referring to FIG. 2, the first output module 20 may include a first buffer unit 210 and a second buffer unit 220 disposed along the second direction Y. The first buffer unit 210 is disposed close to the signal generation module 10, and the second buffer unit 220 is disposed away from the signal generation module 10. The first buffer unit 210 includes a first output transistor T10, the first output transistor T10 includes a first active part T10A, the second buffer unit 220 includes a second output transistor T9, and the second output transistor T9 includes a second active part T9A. The first active part T10A is a metal oxide semiconductor, and the second active part T9A is a low temperature polysilicon semiconductor.

In this application, the first output module 20 is configured as a combination of low temperature polysilicon transistors and metal oxide transistors. The device effect of the first output module 20 is improved by utilizing high mobility of the low temperature polysilicon transistor and low leakage current of the metal oxide transistor.

In this embodiment, the metal oxide semiconductor is also provided in the display area AA, that is, the metal oxide semiconductor in the non-display area NA and the display area AA can be formed in the same photomask process. The patterning density of metal oxide semiconductors in the non-display area NA and the display area AA is different. If the first output transistor T10 is disposed close to the display area AA, the patterning density of the metal oxide semiconductor in the first output transistor T10 may deviate from the design value.

In the present application, the first output transistor T10 having a metal oxide semiconductor is disposed away from the display area AA, and the second output transistor T9 having a low temperature polysilicon semiconductor is disposed close to the display area AA. This makes a pattern of the metal oxide semiconductor of the first output transistor T10 away from a pattern of the metal oxide semiconductor in the display area AA. This prevents a pitch of the pattern of the metal oxide semiconductor in the non-display area NA from deviating from the designed value due to the patterned adjacent arrangement of the metal oxide semiconductor in the display area AA and the non-display area NA.

Referring to FIG. 2, in the second direction Y, the length of the first output transistor T10 may be greater than the length of the second output transistor T9.

In this embodiment, the first output transistor T10 is a metal oxide transistor. The metal oxide transistor has less leakage current, but mobility of metal oxide transistor is lower. Therefore, in order to improve the driving capability of the first output transistor T10, the present application increases the length of the first output transistor T10 in the second direction Y as much as possible in a limited space, so as to improve the driving capability of the first output transistor T10.

In the display panel 100 of the present application, the second output module 30 includes a third output transistor T6 and a fourth output transistor T7. The third output transistor T6 includes a third active part T6A, and the fourth output transistor T7 includes a fourth active part T7A. The third active part T6A and the fourth active part T7A are low temperature polysilicon semiconductors. The third output transistor T6 and the fourth output transistor T7 are disposed in parallel along the first direction X.

In this embodiment, both the third output transistor T6 and the fourth output transistor T7 in the second output module 30 are low temperature polysilicon semiconductors with high mobility. Therefore, the transistors in the second output module 30 do not need to increase the length in the second direction Y to improve the driving capability of the third output transistor T6 and the fourth output transistor. In addition, the second gate driving signal output by the second output module 30 is a negative pulse signal, and the pulse width of the negative pulse signal is smaller than the pulse width of the positive pulse signal output by the first output module 20. Therefore, the output load of the second output module 30 is lower than the output load of the first output module 20. Therefore, the length of the first output module 20 of the present application in the second direction Y is smaller than the length of the second output module 30 in the second direction Y.

The technical solution of the present application will now be described in conjunction with specific embodiments.

Referring to FIG. 1, the display panel 100 includes a display area AA and a non-display area NA adjacent to the display area AA, and a display part 200 is disposed in the display area AA. Optionally, the non-display area NA surrounds the display area AA, such that the display area AA is surrounded by the non-display area NA. The display area AA is an area within the display panel 100 for performing a display function, and a plurality of display units for realizing its display function are arranged inside it. The non-display area NA may be a frame area of the display panel 100, inside which may be provided functional components that assist the display unit in the display area AA to display.

Referring to FIG. 1, a binding terminal 400 is provided on the lower side of the display area AA. The binding terminal 400 can be connected to an external circuit. The binding terminal 400 transmits the signal input by the external circuit to the data line, so as to drive the display panel 100 to display images. For example, the binding terminal 400 can be bonded and connected to a chip or a chip-on-chip to provide power and driving signals for the display panel 100.

In this embodiment, a plurality of light emitting devices LEDs and sub-pixel circuits for driving the light emitting devices LEDs can be arranged in an array in the display area AA. The sub-pixel circuits may be pixel driving circuits such as 7T1C, 7T2C, and 8T2C, which are not specifically limited in this application.

In this embodiment, the gate driving circuit 300 is disposed in the non-display area NA, and the gate driving circuit 300 may be disposed on both sides of the display area AA. The gate driving circuit 300 may include N GOA units 310 connected in cascade. N GOA units 310 may be arranged along the first direction X. The structure of the GOA unit 310 can be various, for example, the circuit structure in FIG. 3, and FIG. 4 is a timing control diagram in FIG. 3.

Figure 3:
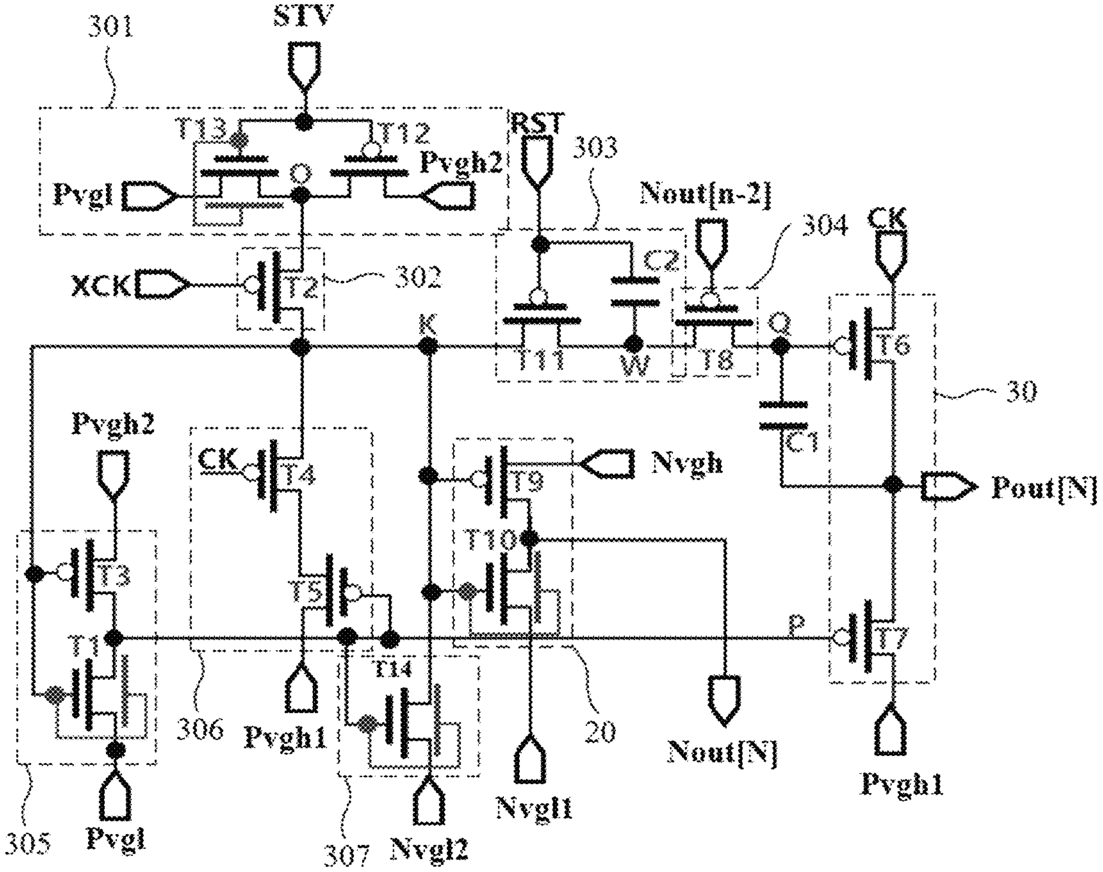
FIG. 3 is a first equivalent circuit diagram of a gate driving circuit in a display panel of the present application.
Figure 4:
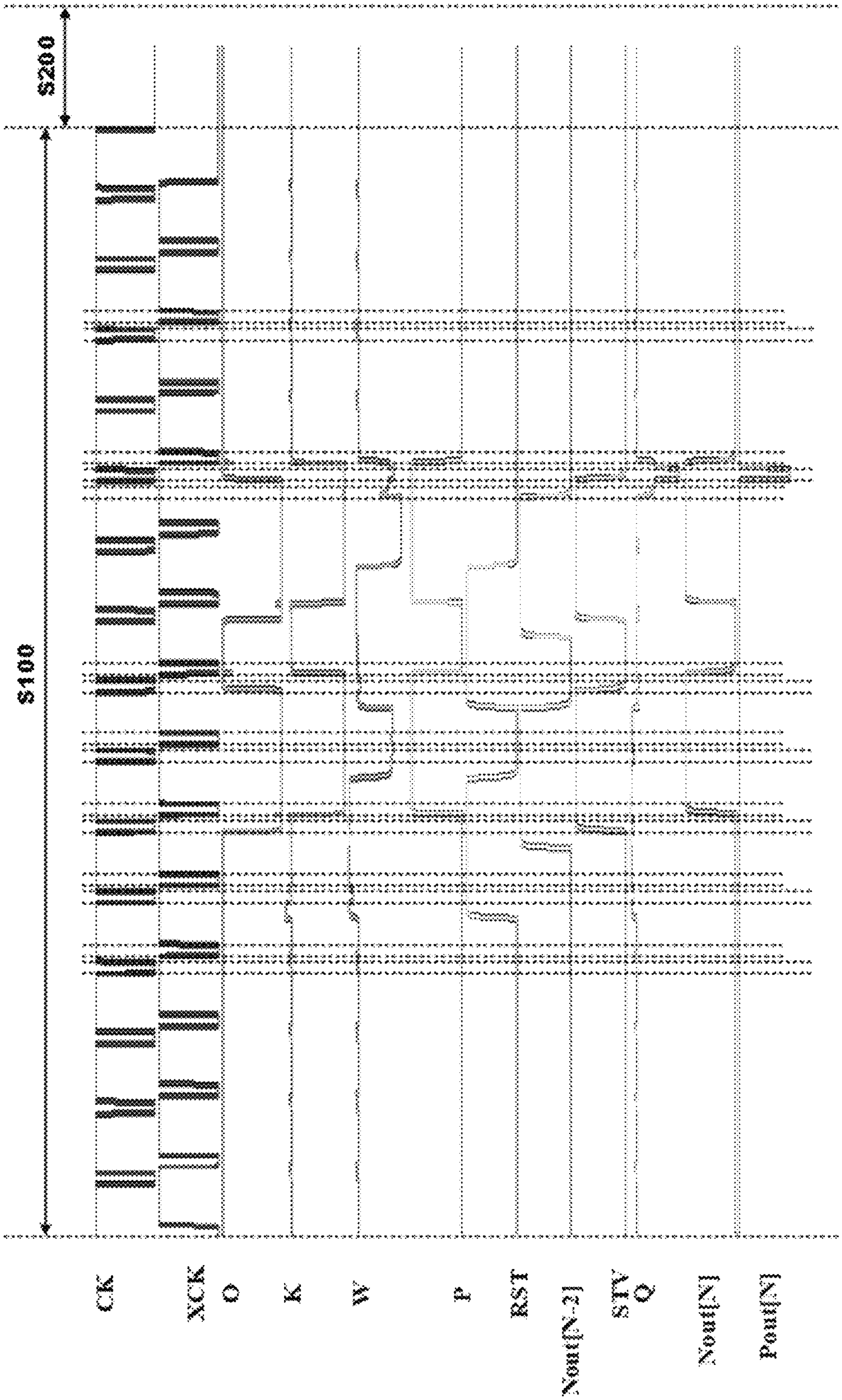
FIG. 4 is a timing control diagram of a gate driving circuit in a display panel of the present application.

Taking the structure of FIG. 3 as an example, each GOA unit 310 may include the following.

Cascade signal selection module 301 is electrically connected between a start signal line STV and a fourth node O.

Pull-up control module 302 controls a potential of a first node K according to a potential of the fourth node O and a potential of a second clock signal line XCK.

First filter module 303 is electrically connected between a fifth node W and the first node K, and a control terminal of the first filter module 303 is electrically connected to a reset signal line RST.

Second filter module 304 is electrically connected between the fifth node W and a second node Q, and a control terminal of the second filter module 304 receives a first gate driving signal of a N−2th cascade.

First inverting module 305 is connected between the first node K and the third node P.

Feedback module 306 is connected between the first node K and the third node P.

First output module 20 is connected between the first node K and a first signal output terminal Nout and is configured to output the first gate driving signal.

Second output module 30 outputs a second gate driving signal according to a potential of the second node Q and a potential of the third node P.

First storage capacitor C1, wherein a first plate C1$a$ of the first storage capacitor C1 is connected to the second node Q, and a second plate C1$b$ of the first storage capacitor C1 is connected to a second signal output terminal Pout.

Voltage regulation module 307, wherein a first end of the voltage regulation module 307 is electrically connected to a first low potential line Nvgl1, a second end of the voltage regulation module 307 is connected to a gate of the first output transistor T10, and a control terminal of the voltage regulation module 307 is electrically connected to the third node P.

In this embodiment, in one frame, the gate driving circuit 300 includes a stage S100 and a stage S200. In this stage S100, the pulses of each first gate driving signal and the pulses of each second gate driving signal are outputted. However, in the stage S200, the pulses of the first gate driving signals and the pulses of the second gate driving signals are unnecessary.

In this embodiment, the cascade signal selection module 301 includes a first cascade transistor T13 and a second cascade transistor T12. The first cascade transistor T13 is a double-gate transistor. Two gates of the first cascade transistor T13 and a gate of the second cascade transistor T12 are connected to the start signal line STV. The source of the first cascade transistor T13 is connected to the second low potential line Pvgl. The drain of the first cascade transistor T13 and the source of the second cascade transistor T12 are connected to the fourth node O. The drain of the second cascade transistor T12 is connected to the third high potential line Pvgh2.

In this embodiment, the pull-up control module 302 includes a pull-up transistor T2. The gate of the pull-up transistor T2 is connected to the second clock signal line XCK. The source of the pull-up transistor T2 is connected to the fourth node O. The drain of the pull-up transistor T2 is connected to the first node K.

In this embodiment, the first filter module 303 includes a first filter transistor T11 and a second storage capacitor C2. A gate of the first filter transistor T11 and a third plate C2*a* of the second storage capacitor C2 are connected to a reset signal line RST. A source of the first filter transistor T11 is connected to the first node K. A drain of the first filter transistor T11 and a fourth plate C2*b* of the second storage capacitor C2 are connected to the fifth node W.

In this embodiment, the second filter module 304 includes a second filter transistor T8. A gate of the second filter transistor T8 is connected to a first signal output terminal Nout of a N−2th cascade GOA unit 310. A source of the second filter transistor T8 is connected to the fifth node W, and a drain of the second filter transistor T8 is connected to the second node Q.

In this embodiment, the first inverting module 305 includes a first inverting transistor T3 and a second inverting transistor T1. The second inverting transistor T1 is a double-gate transistor. A gate of the first inverting transistor T3 and both gates of the second inverting transistor T1 are connected to the first node K. A source of the first inverting transistor T3 is connected to a third high potential line Pvgh2. A drain of the first inverting transistor T3 and a source of the second inverting transistor T1 are connected to the third node P. A drain of the second inverting transistor T1 is connected to a second low potential line Pvgl.

In this embodiment, the feedback module 306 includes a first feedback transistor T4 and a second feedback transistor T5. A gate of the first feedback transistor T4 is connected to a first clock signal line CK. A source of the first feedback transistor T4 is connected to the first node K. A drain of the first feedback transistor T4 is connected to a source of the second feedback transistor T5. A gate of the second feedback transistor T5 is connected to the third node P, and a drain of the second feedback transistor T5 is connected to a second high potential line Pvgh1.

In this embodiment, the voltage regulation module 307 includes a regulation transistor T14. The regulation transistor T14 is a double-gate transistor. Both gates of the regulation transistor T14 are connected to the third node P. A source of the regulation transistor T14 is connected to the first node K. A drain of the regulation transistor T14 is connected to a first low potential line Nvgl1.

In this embodiment, the first output module 20 includes a first output transistor T10 and a second output transistor T9. The second output transistor T9 is a double-gate transistor. A first gate T10G of the first output transistor T10 and a second gate T9G of the second output transistor T9 are connected to the first node K of the signal generation module 10. A first source T10S of the first output transistor T10 is connected to the first high potential line Nvgh. A first drain T10D of the first output transistor T10 and a second source T9S of the second output transistor T9 are connected to the first signal output terminal Nout. A second drain T9D of the second output transistor T9 is connected to the first low potential line Nvgl1.

In this embodiment, the second output module 30 includes a third output transistor T6 and a fourth output transistor T7. A third gate T6G of the third output transistor T6 is connected to the second node Q of the signal generation module 10. A third source T6S of the third output transistor T6 is connected to the first clock signal line CK. A third drain T6D of the third output transistor T6 and a fourth source T7S of the fourth output transistor T7 are connected to a second signal output terminal Pout. A fourth gate T7G of the fourth output transistor T7 is connected to the third node P of the signal generation module 10. A fourth drain T7D of the fourth output transistor T7 is connected to the second high potential line Pvgh1.

In this embodiment, the first cascade transistor T13, the second inverting transistor T1, the first output transistor T10, the regulation transistor T14N-type transistor, the second cascade transistor T12, the pull-up transistor T2, the first filter transistor T11, the second filter transistor T8, the first inverting transistor T3, the second output transistor T9, the third output transistor T6, the fourth output transistor T7, the first feedback transistor T4, and the second feedback transistor T5 are P-type transistors.

In the gate driving circuit 300 provided in this embodiment, under the control of the third node P, the voltage regulation module 307 can stabilize or lower the gate potential of the first output transistor T10 through the first low potential line Nvgl1. This makes the first output transistor T10 stable or better in an off state to reduce leakage current. This further enables the potential of the first gate driving signal to be maintained at a high potential or pulse amplitude, thereby improving the potential stability of the gate driving signal.

In this embodiment, the voltage regulation module 307 is configured to stabilize or reduce the low potential of the first node K. Alternatively, in another embodiment, the voltage regulation module 307 is further configured to stabilize or reduce the gate potential of the first output transistor T10 during the duration of the positive pulse of the first gate driving signal.

It should be noted that the regulation transistor T14 can stabilize or reduce the gate potential of the first output transistor T10 during the duration of the positive pulse of the first gate driving signal. This makes the first output transistor T10 stable or better in an off state to reduce leakage current. This further enables the potential of the first gate driving signal to be maintained at a high potential or pulse amplitude, thereby improving the potential stability of the gate driving signal.

In this embodiment, the internal node is the third node P. The second low potential line Pvgl is a low potential line having the same potential as the first low potential line Nvgl1. The channel type of the regulation transistor T14 is the same as that of the first output transistor T10.

It should be noted that in this embodiment, the first output transistor T10 and the regulation transistor T14 can share the same low potential line, which can save the number of wires required by the gate driving circuit 300. The channel type of the regulation transistor T14 is the same as that of the first output transistor T10. This can turn on the regulation transistor T14 when the first output transistor T10 is in the cut-off state, so as to further reduce the gate potential of the first output transistor T10.

Figure 5:
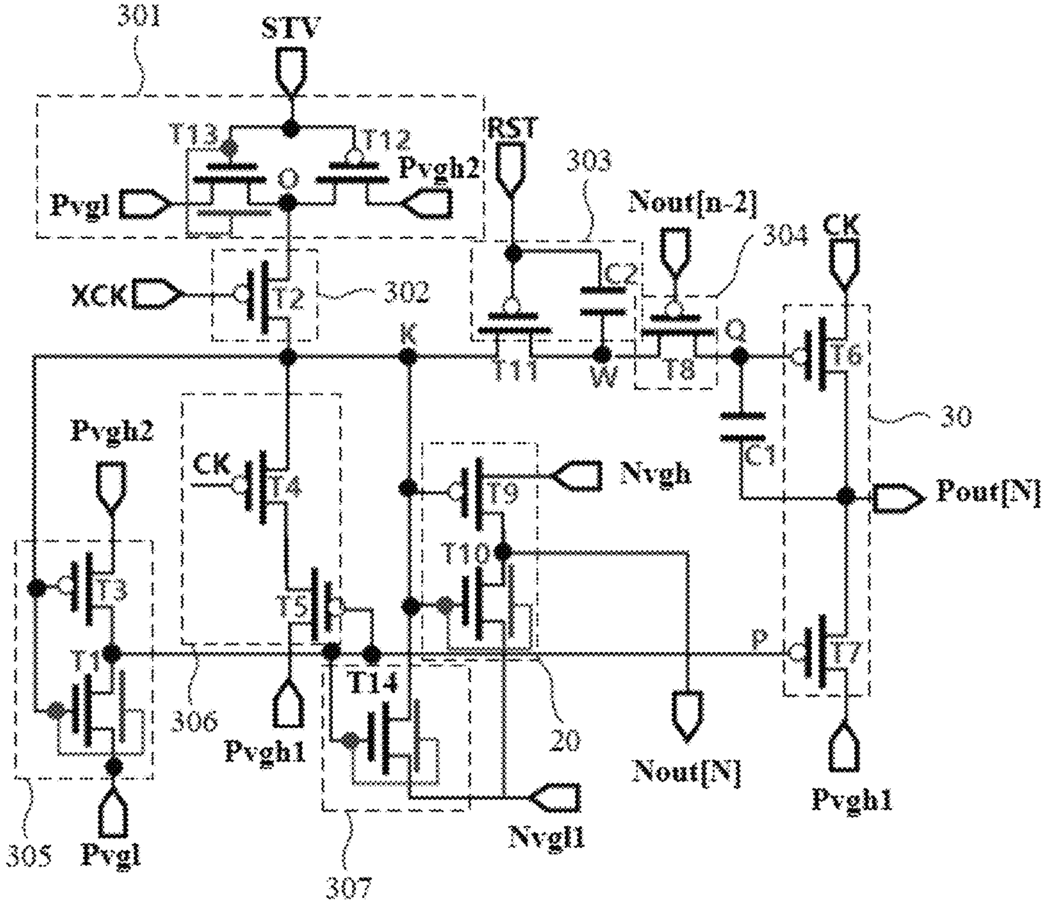
FIG. 5 is a second equivalent circuit diagram of a gate driving circuit in a display panel of the present application.

In an embodiment, referring to FIG. 5, the internal node may be the third node P. The channel type of the regulation transistor T14 is the same as the channel type of the first output transistor T10. The first low potential line Nvgl1 transmits a first low potential signal, and the third low potential line Nvgl2 transmits a second low potential signal. The potential of the second low potential signal is lower than the potential of the first low potential signal.

It should be noted that the channel type of the regulation transistor T14 is the same as that of the first output transistor T10. This can transmit the second low potential signal to the gate of the first output transistor T10 through the regulation transistor T14 when the first output transistor T10 is in the cut-off state. This can further reduce the gate potential of the first output transistor T10, thereby reducing the leakage current of the first output transistor T10. In this way, the stability of the low potential of the second node QK and the low potential of the intermediate node W can be improved.

In one embodiment, the potential difference between the first low potential signal and the second low potential signal is greater than or equal to 2V.

It should be noted that this embodiment can not only reduce the leakage current of the first output transistor T10, but also adjust the threshold voltage of the first output transistor T10 to shift positively. This further increases the range of the threshold voltage of the first output transistor T10.

The film layers of the display panel 100 of the present application will be described below with reference to the structure of FIG. 3.

Figure 6:
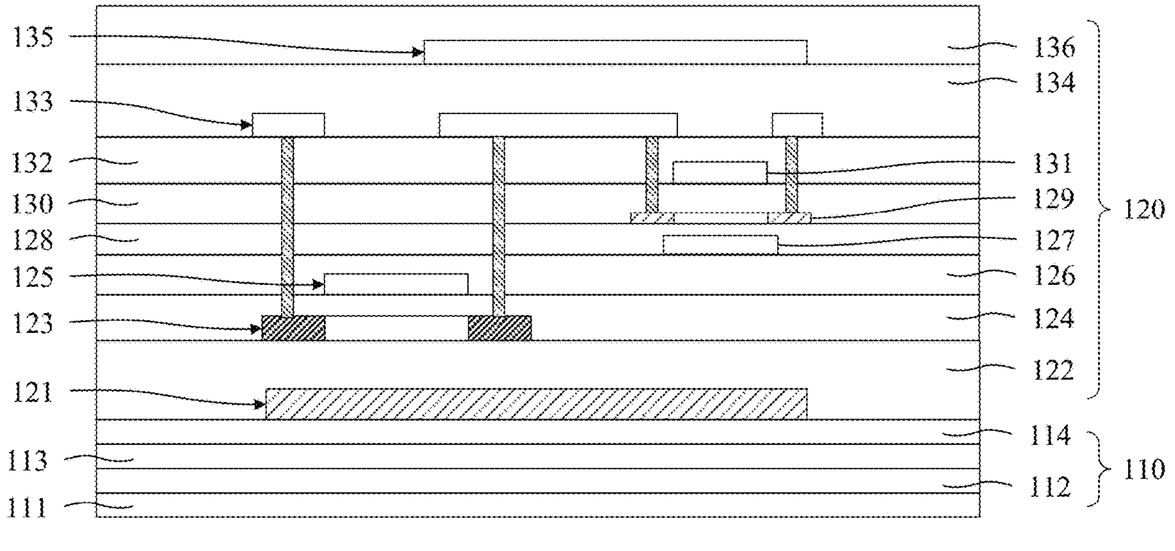
FIG. 6 is a schematic diagram of film layers in a display panel of the present application.

Referring to FIG. 6, the display area AA and the non-display area NA of the display panel 100 may be provided with a base substrate 110 and an array driving layer 120 disposed on the base substrate 110. In the display area AA, the display panel 100 may also be provided with a pixel definition layer disposed on the array driving layer 120, a light emitting device layer disposed on the same layer as the pixel definition layer, and an encapsulation layer disposed on the pixel definition layer. The film structure in the non-display area NA will be mainly described below.

In this embodiment, the base substrate 110 supports various layers disposed on the base substrate 110. When the display panel 100 is a bottom emission light emitting display device or a double side emission light emitting display device, a transparent base substrate is used. When the display panel 100 is a top emission light emitting display device, a translucent or opaque base substrate as well as a transparent base substrate may be used.

In this embodiment, the base substrate 110 is configured to support various film layers disposed on the base substrate 110. The base substrate 110 may be made of an insulating material such as glass, quartz, or polymer resin. The base substrate 110 may be a rigid substrate or a flexible substrate that may be bent, folded, rolled, or the like. Examples of flexible materials for the flexible substrate include polyimide (PI) but are not limited to polyimide (PI).

In this embodiment, the base substrate 110 may include a first flexible substrate 111, a first barrier layer 112, a second flexible substrate 113, and a second barrier layer 114 that are stacked. The first flexible substrate 111 and the second flexible substrate 113 may be formed of the same material such as polyimide. The first barrier layer 112 and the second barrier layer 114 may be formed of, for example, an inorganic material including at least one of SiOx and SiNx.

In this embodiment, the first flexible substrate 111 is formed by coating a polymeric material on a support substrate (not shown) and then curing the polymeric material. The second flexible substrate 113 is formed by coating the same material as that of the first flexible substrate 111 and curing the material. The second flexible substrate 113 is formed by the same method as that of the first flexible substrate 111. Each of the first flexible substrate 111 and the second flexible substrate 113 may be formed to have a thickness of about 8 μm to about 12 μm. In addition, when the base substrate 110 is formed of the first flexible substrate 111 and the second flexible substrate 113, small holes, cracks, etc. formed during the manufacture of the first flexible substrate 111 are covered by the second flexible substrate 113, so that the above-mentioned defects can be removed.

Referring to FIG. 6, the array driving layer 120 may include a plurality of thin film transistors. The thin film transistor may be of etch stop type or back channel etch type. Alternatively, according to the position of the gate and the active layer, it can be divided into structures such as bottom gate thin film transistors and top gate thin film transistors. Alternatively, according to the performance of the thin film transistors, it can be divided into N-type thin film transistors and P-type thin film transistors. The thin film transistor in FIG. 6 does not represent the structural diagram of any transistor in FIG. 2 but is only a schematic diagram of each film layer of the display panel 100 of the present application.

Referring to FIG. 6, the array driving layer 120 may include a light shielding layer 121 disposed on the base substrate 110, a buffer layer 122 disposed on the light shielding layer 121, a first active layer 123 disposed on the buffer layer 122, a first gate insulating layer 124 disposed on the first active layer 123, a first gate layer 125 disposed on the first gate insulating layer 124, a second gate insulating layer 126 disposed on the first gate insulating layer 125, a second gate insulating layer 127 disposed on the second gate insulating layer 126, a third gate insulating layer 128 disposed on the second gate layer 127, a second active layer 129 disposed on the third gate insulating layer 128, a fourth gate insulating layer 130 disposed on the second active layer 129, a third gate layer 131 disposed on the fourth gate insulating layer 130, a first interlayer insulating layer 132 disposed on the third gate layer 131, a first source-drain layer 133 disposed on the first interlayer insulating layer 132, a second interlayer insulating layer 134 disposed on the first source-drain layer 133, a second source-drain layer 135 disposed on the second interlayer insulating layer 134, and a planarization layer 136 disposed on the second source-drain layer 135.

Referring to FIG. 6, the light shielding layer 121 is disposed on the second barrier layer 114, and the light shielding layer 121 is configured to block external light from entering the TFT from the bottom. The material of the light shielding layer 121 may be made of black light shielding material, such as black light shielding metal or black organic material.

Referring to FIG. 6, the buffer layer 122 is disposed on the light shielding layer 121. The buffer layer 122 is configured to isolate the light shielding layer 121 from the upper metal material. The material of the buffer layer 122 may include nitrogen, silicon and oxygen compounds such as a single layer of silicon oxide film or a stacked structure of silicon oxide-silicon nitride.

Referring to FIG. 6, the first active layer 123 is disposed on the buffer layer 122. The second active layer 129 may be disposed on the third gate insulating layer 128. The material of the first active layer 123 and the second active layer 129 may be InGaZnO semiconductor, amorphous silicon, or low temperature polysilicon. For example, in the present application, the material of the first active layer 123 may be low temperature polysilicon, and the material of the second active layer 129 may be InGaZnO semiconductor.

Referring to FIG. 6, the first gate insulating layer 124, the second gate insulating layer 126, the third gate insulating layer 128, the fourth gate insulating layer 130, the first interlayer insulating layer 132, and the second interlayer insulating layer 134 are respectively disposed on corresponding metal layers or semiconductor layers and are separated by different metal layers or semiconductor layers.

The materials of the first gate insulating layer 124, the second gate insulating layer 126, the first i interlayer insulating layer 132, the third gate insulating layer 128, the fourth gate insulating layer 130, and the second interlayer insulating layer 134 can be composed of an inorganic compound composed of silicon nitride and silicon or an organic material with flatness.

Referring to FIG. 6, the first gate layer 125, the second gate layer 127, and the third gate layer 131 are respectively disposed on corresponding insulating layers. The material of the first gate layer 125, the second gate layer 127, and the third gate layer 131 may be copper, molybdenum, or molybdenum-titanium alloy.

Referring to FIG. 6, the first source-drain layer 133 is disposed on the first interlayer insulating layer 132. The second source-drain layer 135 is disposed on the second interlayer insulating layer 134. The material of the first source-drain layer 133 and the second source-drain layer 135 may be copper or molybdenum-titanium alloy, copper or titanium, and the like.

Referring to FIG. 6, the planarization layer 136 is laid on the entire layer to ensure the film layer planarity of the array driving layer 120. The material of the planarization layer 136 can be composed of an inorganic compound composed of silicon nitride and silicon or an organic material with planarity.

Figure 7:
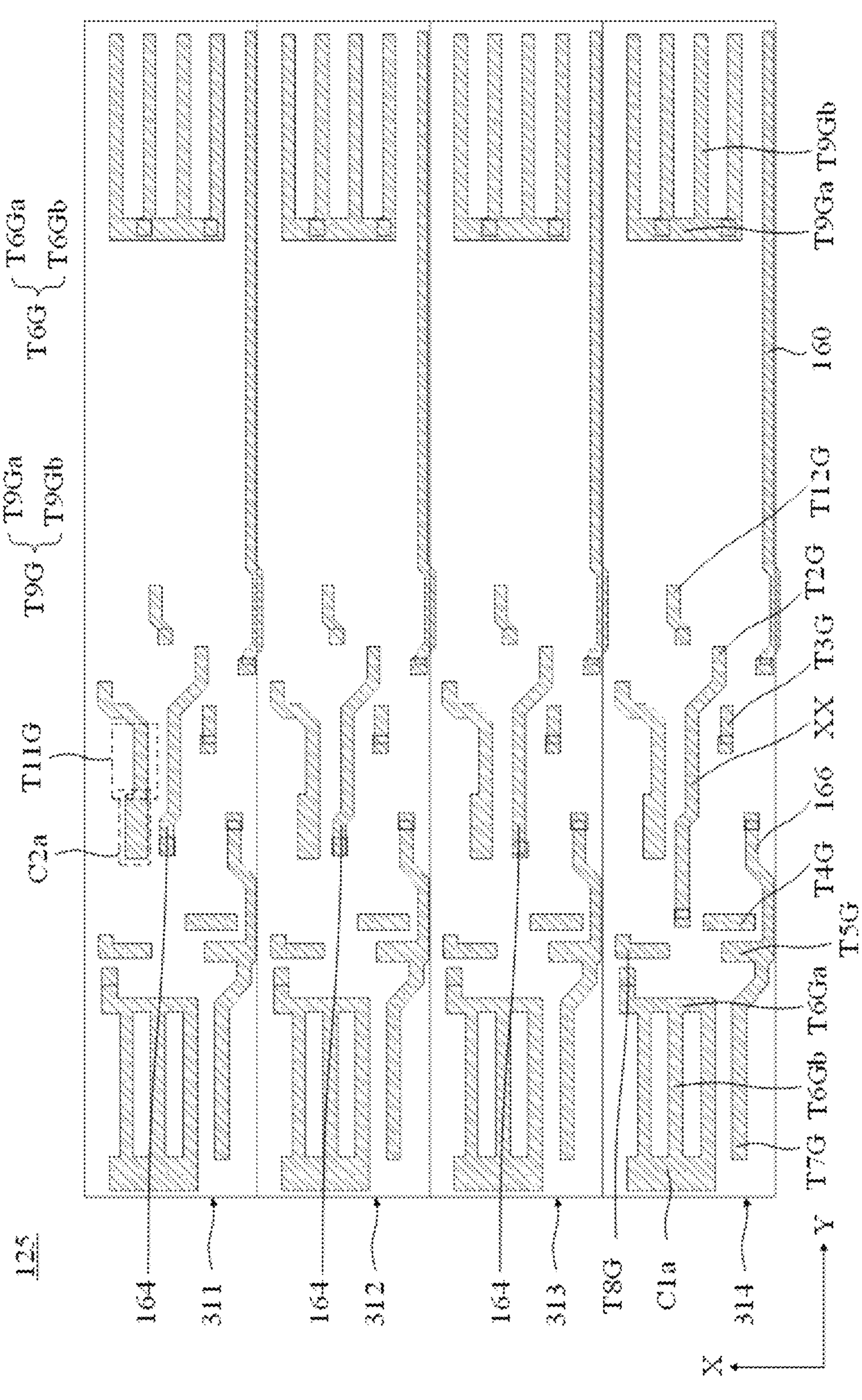
FIG. 7 is a film layer diagram of a first gate layer in a display panel of the present application.

Referring to FIG. 7, FIG. 7 is a film layer diagram of the first gate layer 125 in the display panel 100 of the present application.

In this embodiment, the first gate layer 125 may include a second gate T9G and a third gate T6G. In the second direction Y, the length of the second gate T9G is greater than the length of the third gate T6G, and an area of the second gate T9G is greater than an area of the third gate T6G.

In this embodiment, the second output transistor T9 is configured to output the first gate driving signal, and the third output transistor T6 is configured to output the second gate driving signal. The load of the first gate driving signal is greater than the load of the second gate driving signal, therefore, in order to increase the output load of the first output module 20, the application makes the area of the second gate T9G larger than the area of the third gate T6G.

Referring to FIG. 7, the second gate T9G may include a second trunk gate T9Ga and a plurality of second branch gates T9Gb arranged at intervals. The second trunk gate T9Ga extends along the first direction X, and the second branch gate T9Gb extends along the second direction Y. One end of the plurality of second branch gates T9Gb facing the signal generation module 10 is electrically connected to the second trunk gate T9Ga. For example, the second gate T9G may include one second trunk gate T9Ga and four second branch gates T9Gb.

Referring to FIG. 7, the third gate T6G may include a third trunk gate T6Ga and a plurality of third branch gates T6Gb arranged at intervals. The third trunk gate T6Ga extends along the first direction X, and the third branch gate T6Gb extends along the second direction Y. One end of the plurality of third branch gates T6Gb facing the signal generation module 10 is electrically connected to the third trunk gate T6Ga. For example, the third gate T6G includes one third trunk gate T6Ga and three third branch gates T6Gb.

In this embodiment, both the length and the number of the strip branch gates in the second direction Y are positively correlated with the output load of the output transistor. Therefore, in order to improve the driving capability of the second gate T9G and the third gate T6G, the present application sets the second gate T9G and the third gate T6G as a plurality of strip-shaped branch gates arranged separately. Each strip branch gate bears the load of the corresponding transistor. The strip-shaped branch electrodes correspond to the channels of the active parts of the corresponding transistors. Between two adjacent strip-shaped branch gates corresponds to the source and drain of the upper layer. The composite electric field formed by a plurality of separately arranged strip-shaped branch gates can improve the driving capability of the transistor.

In this embodiment, in the first direction X, the distance between two adjacent second branch gates T9Gb and the distance between two adjacent third branch gates T6Gb may be equal.

Referring to FIG. 7, the first gate layer 125 further includes a fourth gate T7G. The fourth gate T7G extends along the second direction Y, and the fourth gate T7G and the plurality of third branch gates T6Gb in the third gate T6G are arranged in parallel and at intervals.

In this embodiment, the third output transistor T6 is connected to the first clock signal line CK, and it needs to bear a relatively large load. Therefore, in the present application, the third gate T6G is provided with three strip-shaped branch gates. The fourth gate T7G is not connected to the corresponding clock signal line, and the load that the fourth output transistor T7 needs to bear is relatively small. Therefore, the fourth gate T7G is only provided with a strip-shaped branch gate.

In this embodiment, in the first direction X, a distance between the fourth gate T7G and the adjacent third branch gate T6Gb may be equal to the distance between two adjacent third branch gates T6Gb. That is, the distance between two adjacent second branch gates T9Gb, the distance between two adjacent third branch gates T6Gb, and the distance between the fourth gate T7G and the adjacent third branch gate T6Gb are all equal. That is, the spacing between the strip-shaped branch electrodes is equal, which reduces the difficulty of patterning.

Referring to FIG. 7, the first gate layer 125 further includes a first plate C1*a*. One end of the plurality of third branch gates T6Gb away from the signal generation module 10 is connected to the first plate C1*a*. For example, the first plate C1*a* is connected to three third branch gates T6Gb. The three third branch gates T6Gb transmit voltage signals to different positions of the first plate C1*a*. This enables any region of the first plate C1*a* to simultaneously receive voltage signals transmitted through the three third branch gates T6Gb.

Referring to FIG. 7, in the second direction Y, the width of the first electrode plate C1*a* is greater than the width of the third trunk gate T6Ga. The capacitance of the storage capacitor is positively correlated with the opposite panel of the plate in the storage capacitor. Therefore, the present application can make the width of the first plate C1*a* larger than the width of the third trunk gate T6Ga in a limited space. This increases the area of the first plate C1*a* to increase the facing area between the two plates and increase the capacitance of the first storage capacitor C1.

Referring to FIG. 7, the first gate layer 125 also includes a gate T2G of the pull-up transistor T2, a gate T3G of the first inverting transistor T3, a gate T4G of the first feedback transistor T4, a gate T5G of the second feedback transistor T5, a gate T8G of the second filter transistor T8, a gate T11G of the first filter transistor T11, a gate T12G of the second cascade transistor T12, and the third plate C2*a* of the second storage capacitor C2.

In this embodiment, the gate T2G of the pull-up transistor T2, the gate T3G of the first inverting transistor T3, the gate T11G of the first filter transistor T11, the gate T12G of the second cascade transistor T12, the third plate C2*a* of the second storage capacitor C2 extend along the second direction Y, the gate T12G of the second cascade transistor T12 disposed close to the first output module 20, the gate T3G of the first inverting transistor T3, the gate T2G of the pull-up transistor T2, and the gate T11G of the first filter transistor T11 are sequentially arranged along the first direction X in the middle area of the signal generation module 10. The gate T12G of the second cascade transistor T12 is on the same straight line as the third plate C2*a* of the second storage capacitor C2. The gate T11G of the first filter transistor T11 is directly connected to the third plate C2*a* of the second storage capacitor C2.

In this embodiment, the gate T4G of the first feedback transistor T4, the gate T5G of the second feedback transistor T5, and the gate T8G of the second filter transistor T8 extend along the first direction X, and the three are arranged close to the second output module 30. The gate T4G of the first feedback transistor T4 and the gate T5G of the second feedback transistor T5 are arranged in parallel along the second direction Y. The gate T4G of the first feedback transistor T4 is disposed away from the fourth gate T7G, and the gate T5G of the second feedback transistor T5 is disposed close to the fourth gate T7G. The gate T5G of the second feedback transistor T5 and the gate T8G of the second filter transistor T8 are arranged along the first direction X. The gate T5G of the second feedback transistor T5 is directly connected to the extended section of the fourth gate T7G of the fourth output transistor T7 in the second direction Y.

Figure 8:
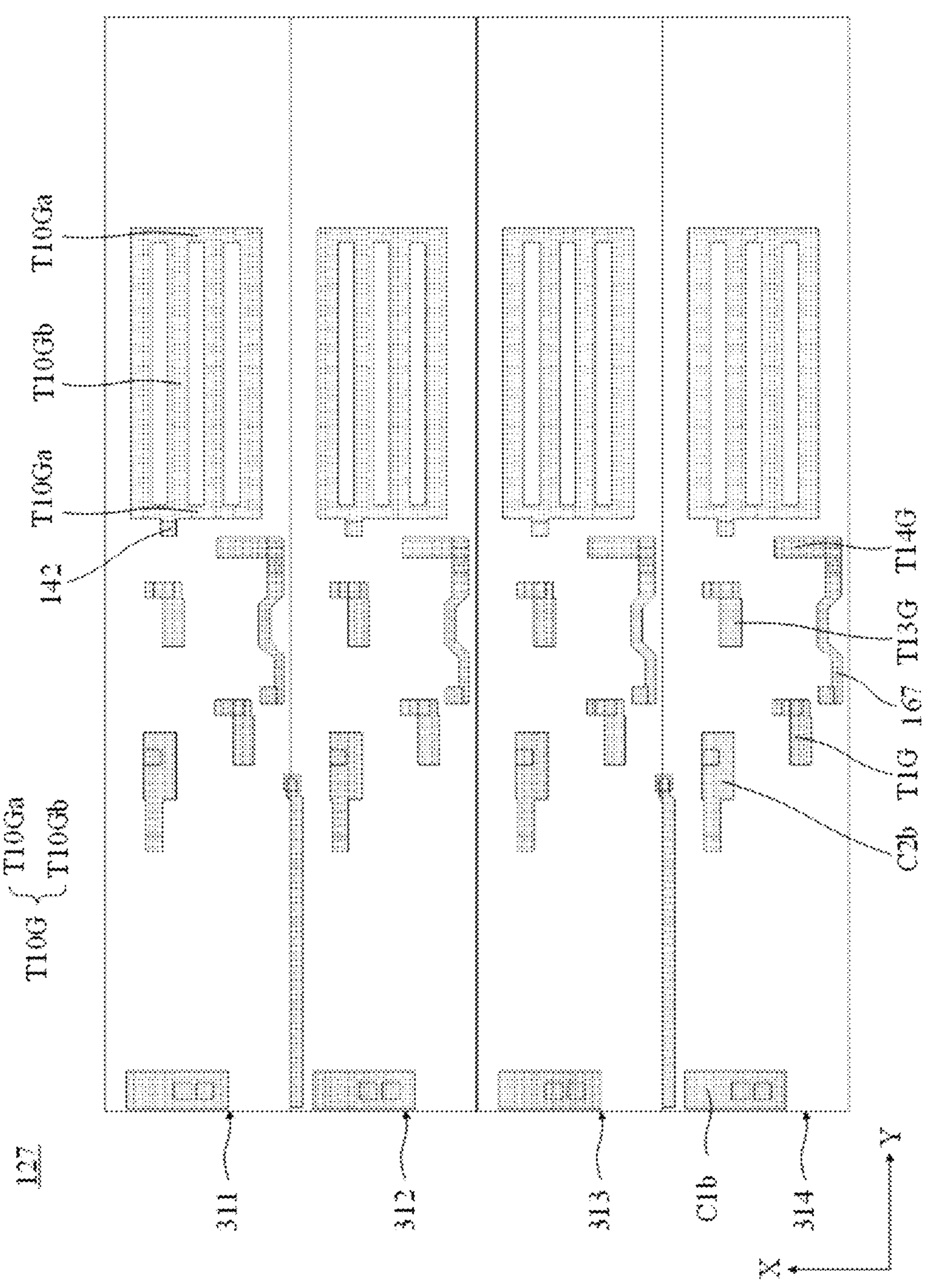
FIG. 8 is a film layer diagram of a second gate layer in a display panel of the present application.

Referring to FIG. 8, FIG. 8 is a film layer diagram of the second gate layer 127 in the display panel 100 of the present application.

The second gate layer 127 may include a first gate T10G. The first gate T10G includes two first trunk gates T10Ga and a plurality of first branch gates T10Gb disposed between the two first trunk gates T10Ga. The two first trunk gates T10Ga are opposite and arranged in parallel. The two first trunk gates T10Ga extend along the first direction X, and the plurality of first branch gates T10Gb extend along the second direction Y. Both ends of the plurality of first branch gates T10Gb are respectively connected to two first trunk gates T10Ga. For example, the first gate T10G includes two first trunk gates T10Ga and four first branch gates T10Gb. Both ends of the four first branch gates T10Gb are respectively connected to the two first trunk gates T10Ga.

In this embodiment, in the second direction Y, the length of the first branch gate T10Gb is greater than the length of the second branch gate T9Gb. The first output transistor T10 is a metal oxide semiconductor transistor with low mobility. Therefore, in order to improve the driving capability of the first output transistor T10, the present application increases the length of the first branch gate T10Gb. That is, it is equivalent to increasing the width of the channel in the first active portion T10A and improving the electron mobility in the first output transistor T10. This ensures the driving capability of the first output transistor T10.

Referring to FIG. 8, the second gate layer 127 further includes a second plate C1*b* of the first storage capacitor C1. The first plate C1*a* and the second plate C1*b* are opposite and arranged in parallel. The orthographic projection of the first plate C1*a* on the second plate C1*b* is located inside the second plate C1*b*. The capacitance of the storage capacitor is positively correlated with the opposite panel of the plate in the storage capacitor. Therefore, the present application can make the orthographic projection of the first plate C1*a* on the second plate C1*b* be located in the second plate C1*b* in a limited space. That is, the area of the first plate C1*a* is smaller than or equal to the area of the second plate C1*b*. In this embodiment, the area of the first plate C1*a* is smaller than the area of the second plate C1*b*. That is, increase the area of the second plate C1*b* as much as possible to increase the facing area between the two plates. This increases the capacitance of the first storage capacitor C1 to improve the output stability of the first signal output terminal Nout.

In this embodiment, the second gate layer 127 further includes the first gate T1G of the second inverting transistor T1, the first gate T131G of the first cascade transistor T13, the first gate T14G of the regulation transistor T14, and the fourth plate C2*b* of the second storage capacitor C2. The first gate T1G of the second inverting transistor T1, the first gate T13G of the first cascade transistor T13, and the fourth plate C2 *b* of the second storage capacitor C2 extend along the second direction Y. The first gate T14G of the regulation transistor T14 extends along the first direction X.

Figure 9:
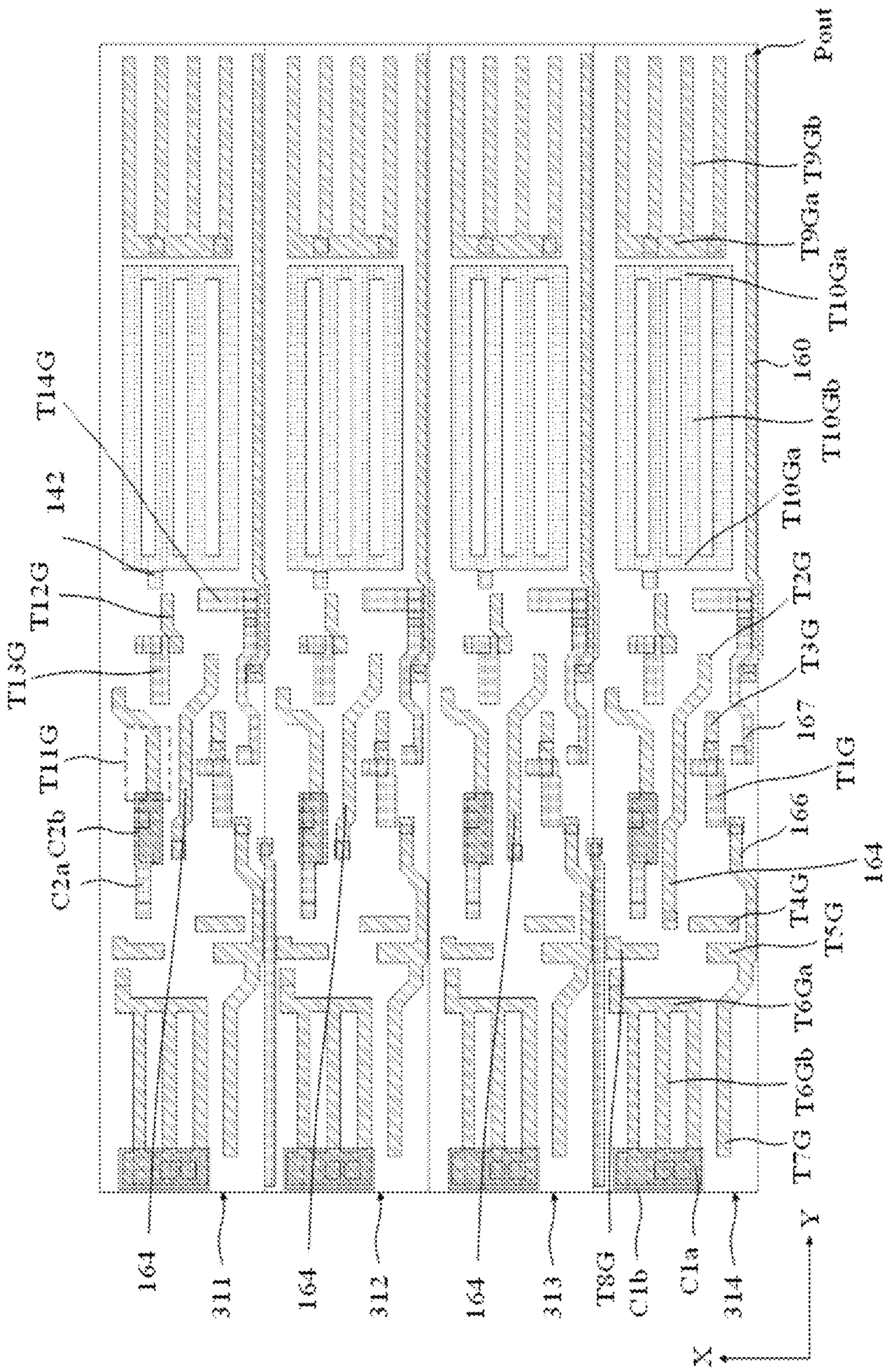
FIG. 9 is a film layer diagram of a superposition of a first gate layer and a second gate layer in a display panel of the present application.

Referring to FIG. 9, FIG. 9 is a film layer diagram of a superposition of the first gate layer 125 and the second gate layer 127 in the display panel 100 of the present application.

In this embodiment, the orthographic projection of the third plate C2*a* on the fourth plate C2*b* is located inside the fourth plate C2*b*. That is, the area of the third plate C2*a* is smaller than or equal to the area of the fourth plate C2*b*. In this embodiment, the area of the third plate C2*a* is smaller than the area of the fourth plate C2*b*. That is, increase the area of the fourth plate C2*b* as much as possible to increase the facing area between the two plates. This increases the capacitance of the second storage capacitor C2 to improve the stability of the voltage in the fifth node W.

In this embodiment, the capacitance of the second storage capacitor C2 needs to be larger than 50 F.

In this embodiment, the area of the first plate C1*a* is greater than the area of the third plate C2*a*, and the area of the second plate is greater than the area of the fourth plate C2*b*. The ratio of the capacitance of the first storage capacitor C1 to the capacitance of the second storage capacitor C2 is greater than 2. The first plate C1*a* of the first storage capacitor C1 is connected to the third gate T6G of the third output transistor T6. The second plate C1*b* of the first storage capacitor C1 is connected to the third drain T6D of the third output transistor T6. The third source T6S of the third output transistor T6 is connected to the first clock signal line CK. The output signal of the clock signal line at different times may be reversed, which may affect the stability of the output signal of the second signal output terminal Pout connected to the third drain T6D of the third output transistor T6. Therefore, the present application ensures the output stability of the first signal output terminal Nout by increasing the capacitance of the first storage capacitor C1.

In the structure of FIG. 9, the gate T1G of the second inverting transistor T1 is adjacent to the gate T3G of the first inverting transistor T3. The gate T12G of the second cascade transistor T12 is disposed between the gate T13G of the first cascade transistor T13 and the first gate T10G. The gate T13G of the first cascade transistor T13 is adjacent to the gate T12G of the second cascade transistor T12. The gate T14G of the regulation transistor T14 is disposed between the gate T2G of the pull-up transistor T2 and the first gate T10G. The gate T13G of the first cascade transistor T13 is disposed on a side away from the gate T12G of the second cascade transistor T12 away from the first gate T10G.

Figure 10:
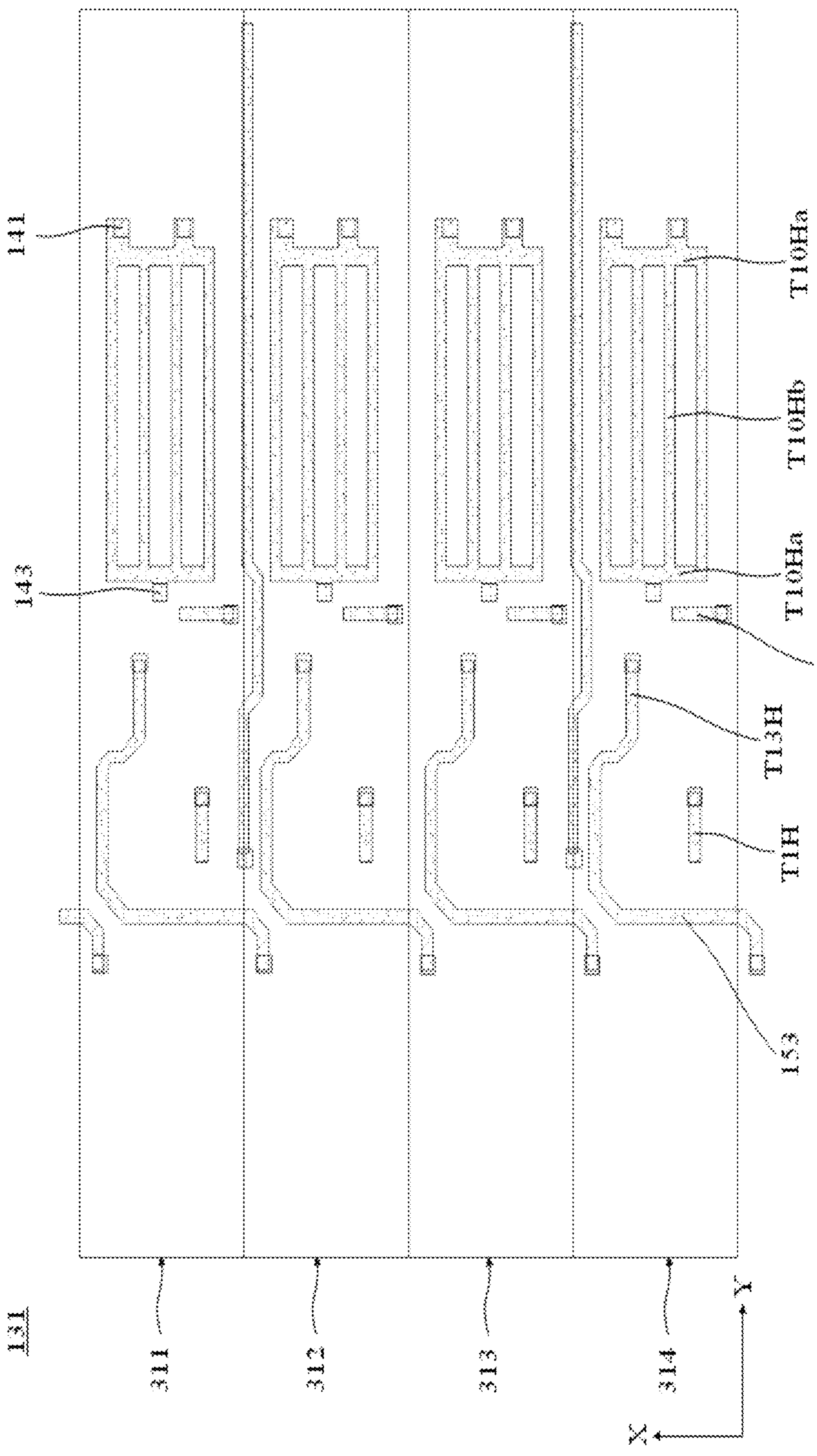
FIG. 10 is a film layer diagram of a third gate layer in a display panel of the present application.

Referring to FIG. 10, FIG. 10 is a film layer diagram of the third gate layer 131 in the display panel 100 of the present application.

The array driving layer 120 further includes a third gate layer 131 disposed on a side of the second gate layer 127 away from the base substrate 110. The third gate layer 131 includes a fifth gate T10H. The fifth gate T10H includes two fifth trunk gates T10Ha and a plurality of fifth branch gates T10Hb disposed between the two fifth trunk gates T10Ha. The two fifth trunk gates T10Ha are opposite and arranged in parallel. The two fifth trunk gates T10Ha extend along the first direction X, and the plurality of fifth branch gates T10Hb extend along the second direction Y. Both ends of the plurality of fifth branch gates T10Hb are respectively connected to the two first trunk gates T10Ga. For example, the fifth gate T10H may include 2 fifth trunk gates T10Ha and 4 fifth branch gates T10Hb. Both ends of the four fifth branch gates T10Hb are connected to the two fifth trunk gates T10Ha.

In this embodiment, the first output transistor T10 is a double-gate transistor. The first gate T10G and the fifth gate T10H of the first output transistor T10 are disposed on upper and lower sides of the first active part T10A. The first gate T10G and the fifth gate T10H are electrically connected to simultaneously drive the transfer of carriers in the first active part T10A, thereby increasing the conduction rate of the first output transistor T10.

In this embodiment, in the second direction Y, the length of the first branch gate T10Gb is equal to the length of the fifth branch gate T10Hb. Both the first branch gate T10Gb and the fifth branch gate T10Hb bear the output load of the first output transistor T10. In addition, the fifth branch gate T10Hb needs to be used as a shielding layer to perform ion doping on the first active part T10A. Therefore, the length of the channel in the first active part T10A in the first direction X is equal to the length of the fifth branch gate T10Hb in the fifth gate T10H in the first direction X. In order to ensure that external light enters the first active part T10A, the present application makes the orthographic projection of the fifth branch gate T10Hb on the corresponding first branch gate T10Gb be located within the corresponding first branch gate T10Gb. That is, the area of the first branch gate T10Gb is greater than or equal to the area of the fifth branch gate T10Hb. In this embodiment, the area of the first branch gate T10Gb may be greater than the area of the fifth branch gate T10Hb. It may also be that the distance between two adjacent first branch gates T10Gb is smaller than the distance between two adjacent fifth branch gates T10Hb.

In this embodiment, the distance between two adjacent first branch gates T10Gb may be smaller than the distance between two adjacent second branch gates T9Gb in the second output transistor T9. The distance between two adjacent second branch gates T9Gb may be smaller than the distance between two adjacent fifth branch gates T10Hb.

Figure 11:
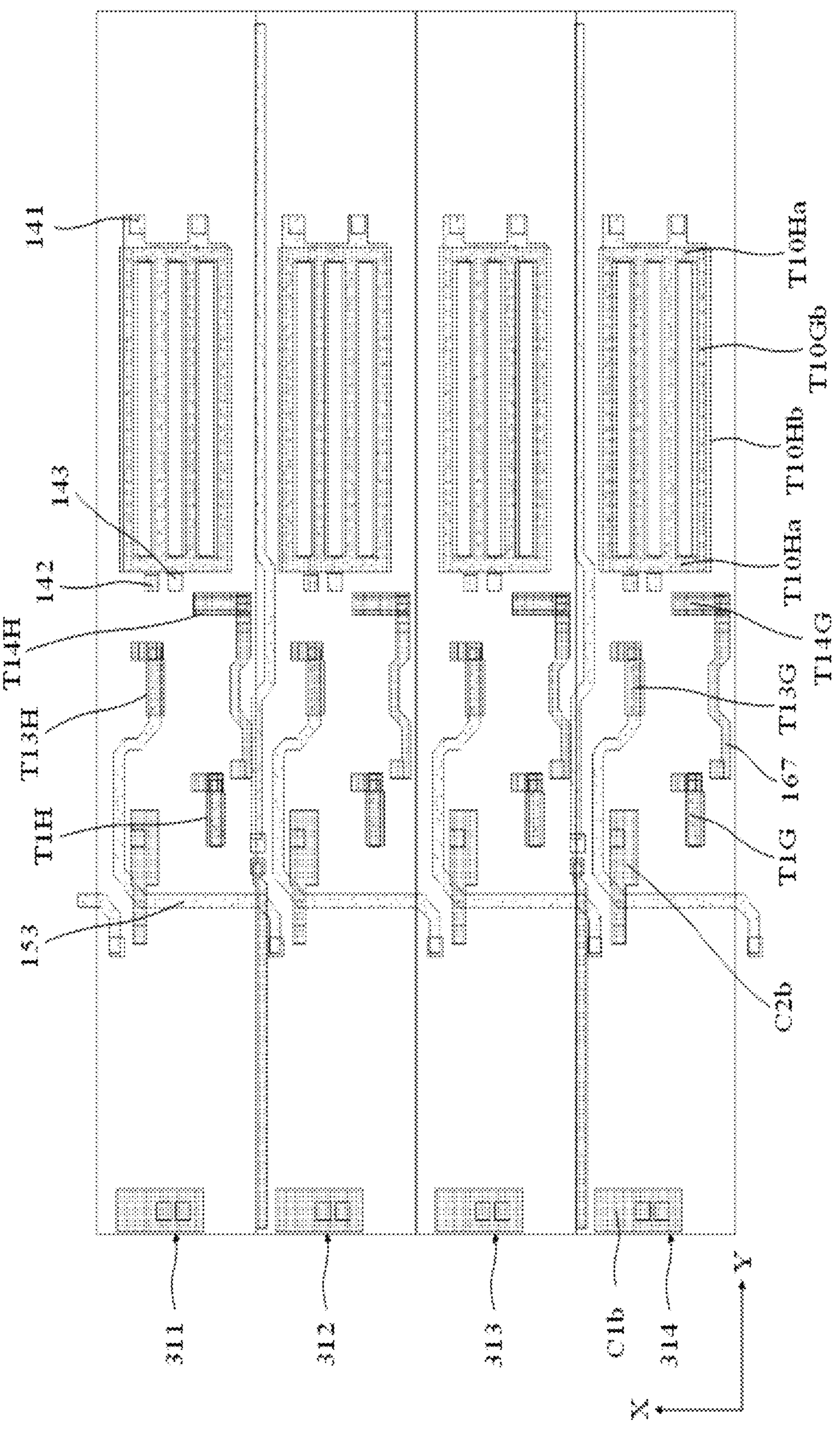
FIG. 11 is a film layer diagram of a superposition of a second gate layer and a third gate layer in a display panel of the present application.

Referring to FIG. 11, FIG. 11 is a film layer diagram of a superposition of the second gate layer 127 and the third gate layer 131 in the display panel 100 of the present application.

The second inverting transistor T1, the first cascade transistor T13, and the regulation transistor T14 are metal oxide semiconductor transistors. Therefore, in order to improve the driving capability of the second inverting transistor T1, the first cascade transistor T13, and the regulation transistor T14, the second inverting transistor T1, the first cascade transistor T13, and the regulation transistor T14 can all be double-gate transistors. That is, the third gate layer 131 may further include a second gate T1H of the second inverting transistor T1, a second gate T13H of the first cascade transistor T13, and a second gate T14H of the regulation transistor T14. The second gate T1H of the second inverting transistor T1 and the second gate T13H of the first cascade transistor T13 extend along the second direction Y. The second gate T14H of the regulation transistor T14 extends along the first direction X.

In this embodiment, in order to prevent external light from entering the active parts of the second inverting transistor T1, the first cascade transistor T13, and the regulation transistor T14, the second gate T1H of the second inverting transistor T1 is orthographically projected on the corresponding first gate T1G into the corresponding first gate T1G. The second gate T13H of the first cascade transistor T13 is orthographically projected on the corresponding first gate T13G into the corresponding first gate T13G. The second gate T14H in the regulation transistor T14 is projected orthographically on the corresponding first gate T14G within the corresponding first gate T14G. The area of the second gate T1H of the second inverting transistor T1 is smaller than the area of the corresponding first gate T1G. The area of the second gate T13H of the first cascade transistor T13 is smaller than the area of the corresponding first gate T13G. The area of the second gate T14H in the regulation transistor T14 is smaller than the area of the corresponding first gate T14G.

Figure 12:
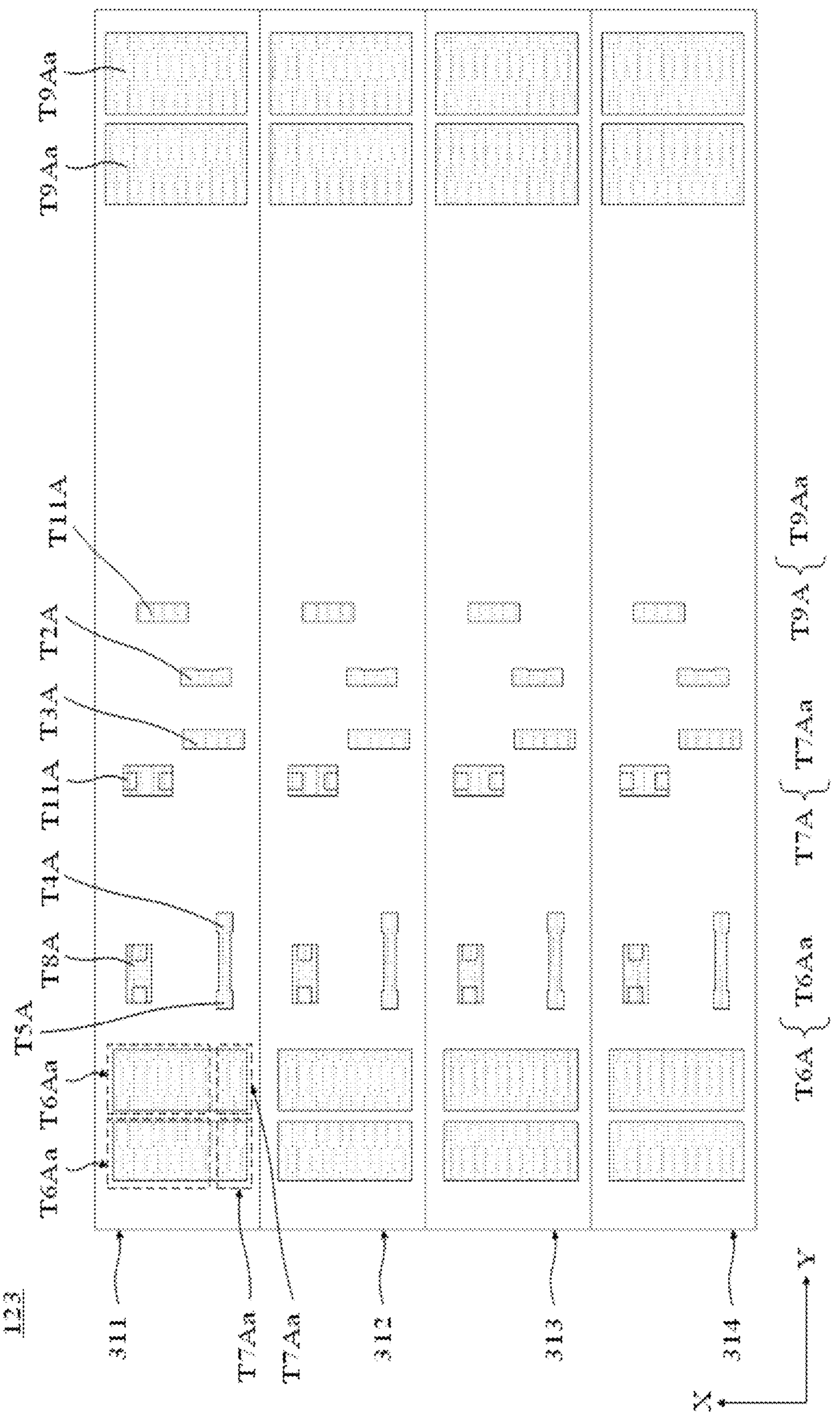
FIG. 12 is a film layer diagram of the first active layer in the display panel of the present application.
Figure 13:
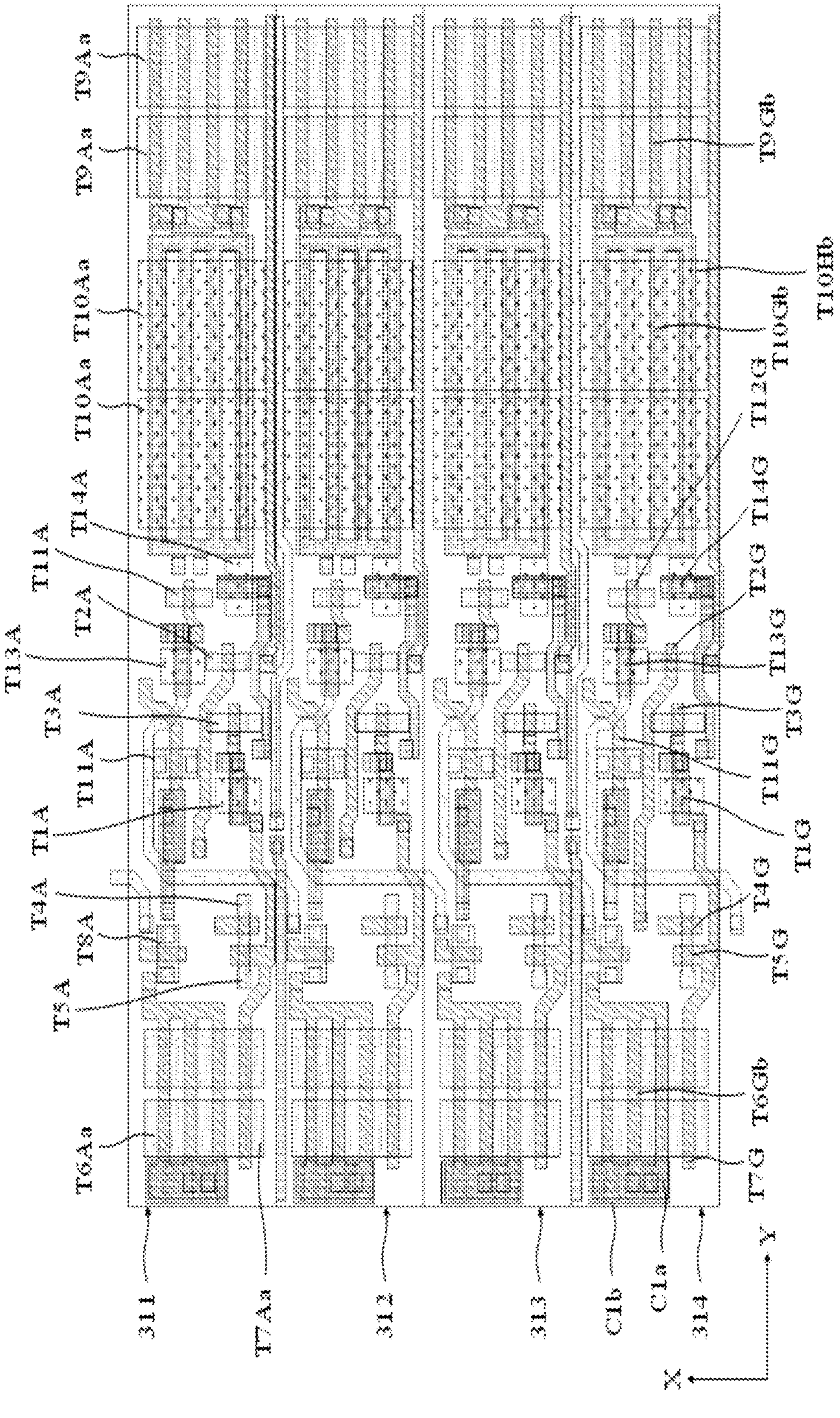
FIG. 13 is a film layer diagram of a superposition of a first gate layer, a second gate layer, a third gate layer, a first active layer, and a second active layer in a display panel of the present application.

Referring to FIG. 12 and FIG. 13, FIG. 12 is a film layer diagram of the first active layer 123 in the display panel 100 of the present application, and FIG. 13 is a film layer diagram of a superposition of the first gate layer 125, the second gate layer 127, the third gate layer 131, the first active layer 123, and the second active layer 129 in the display panel 100 of the present application.

The array driving layer 120 also includes a first active layer 123 disposed between the first gate layer 125 and the base substrate 110. The first active layer 123 includes a low temperature polysilicon semiconductor. The first active layer 123 includes a second active part T9A and a third active part T6A. The second active part T9A overlaps with the plurality of second branch gates T9Gb. The third active part T6A overlaps with the plurality of third branch gates T6Gb.

In this embodiment, the second output transistor T9 and the third output transistor T6 are top-gate transistors. The second gate T9G can be used as a shielding layer of the second active part T9A to perform ion doping on the second active part T9A. The third gate T6G may serve as a shielding layer for the third active part T6A, so as to perform ion doping on the third active part T6A. Therefore, the part of the active part that overlaps with the corresponding branch gate is the channel part, and the non-overlapping part of the active part is the source connection part and the drain connection part on both sides of the channel part. For example, in the structure of FIG. 14, the second active part T9A overlaps with the four second branch gates T9Gb. The third active part T6A overlaps the three third branch gates T6Gb, the second active part T9A has four channel parts, and the third active part T6A has three channel parts.

In this embodiment, the lengths of the second branch gate T9Gb and the third branch gate T6Gb in the second direction Y are sufficiently long. Therefore, in order to increase the width of the channel in the active part, the dimensions of the second active part T9A and the third active part T6A in the second direction Y are increased as much as possible. When the size of the low temperature polysilicon semiconductor in the second direction Y is too large, static electricity may be concentrated in the active part. This may cause the active part to be damaged by static electricity. Therefore, in the present application, the second active part T9A and the third active part T6A can be set as two sub-active parts separately arranged.

Referring to FIG. 12 and FIG. 13, the second active part T9A may include two second sub-active parts T9Aa arranged at intervals. The third active part T6A includes two third sub-active parts T6Aa arranged at intervals. The second sub-active part T9Aa and the third sub-active part T6Aa extend along the first direction X. The two second sub-active parts T9Aa and the two third sub-active parts T6Aa are separately arranged to reduce the size of the second active part T9A and the third active part T6A in the third direction. This avoids the technical problem of static electricity concentration in the active part.

In this embodiment, in the second direction Y, the width of the second sub-active part T9Aa is greater than the width of the third sub-active part T6Aa. The output load of the second output transistor T9 is larger than the output load of the third output transistor T6. Therefore, the present application increases the second output load by increasing the width of the second sub-active part T9Aa.

It should be noted that, the width of the second sub-active part T9Aa and the width of the third sub-active part T6Aa correspond to the width of the sub-active part in the second direction Y.

Referring to FIG. 12 and FIG. 13, the first active layer 123 further includes a fourth active part T7A. The fourth active part T7A includes two fourth sub-active parts T7Aa arranged at intervals. The two fourth sub-active parts T7Aa overlap with the fourth gate T7G. The fourth sub-active part T7Aa is connected to the corresponding third sub-active part T6Aa. For example, one fourth active part T7A overlaps with one fourth gate T7G. The fourth active part T7A has one channel.

In this embodiment, in the second direction Y, the width of the fourth sub-active part T7Aa may be equal to the width of the third sub-active part T6Aa.

In this embodiment, in order to simplify the process, the pattern of the third active part T6A may be connected to the pattern of the fourth active part T7A. This increases the pattern area of the active part in the second output module 30, reduces the film forming precision of the active part in this area, and simplifies the film forming process.

In the structure of FIG. 13, the first active layer 123 further includes an active part T2A of the pull-up transistor T2, an active part T3A of the first inverting transistor T3, an active part T4A of the first feedback transistor T4, an active part T5A of the second feedback transistor T5, an active part T8A of the second filter transistor T8, an active part T11A of the first filter transistor T11, and an active part T12A of the second cascade transistor T12, active parts in the pull-up transistor T2, the first inverting transistor T3, the first feedback transistor T4, the second feedback transistor T5, the second filter transistor T8, the first filter transistor T11, and the second cascade transistor T12 correspond to the gates of the transistors are disposed vertically, and there is an overlapping part with the gate of the corresponding transistor, and the overlapping part is the channel part of the corresponding active part.

Figure 14:
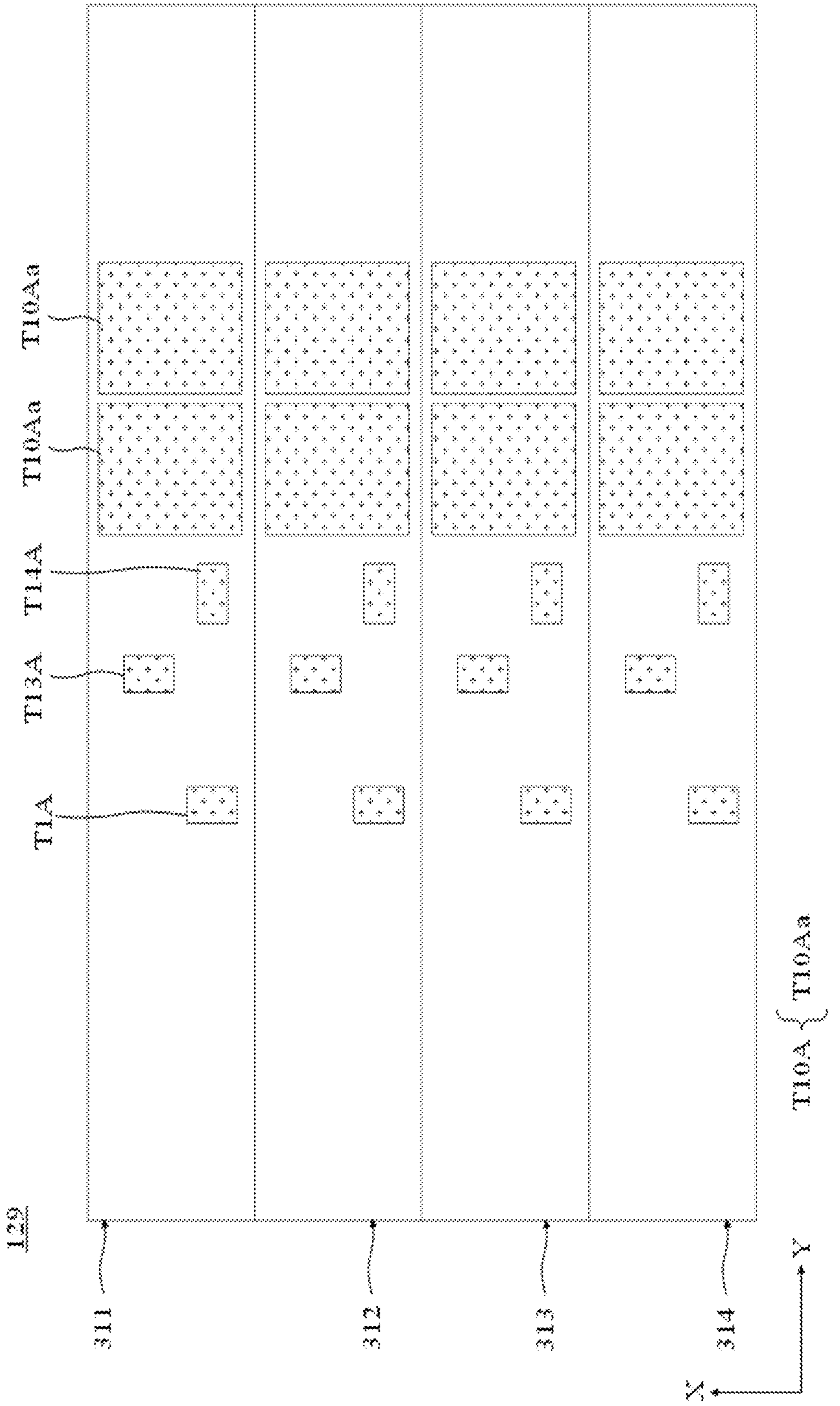
FIG. 14 is a film layer diagram of a second active layer in a display panel of the present application.

Referring to FIG. 14, FIG. 14 is a film layer diagram of the second active layer 129 in the display panel 100 of the present application.

In this embodiment, the array driving layer 120 further includes a second active layer 129 disposed between the third gate layer 131 and the second gate layer 127. The second active layer 129 includes metal oxide semiconductor. The second active layer 129 includes the first active part T10A. The first active part T10A includes two first sub-active parts T10Aa arranged at intervals. The first sub-active part T10Aa extends along the first direction X, and the two first sub-active parts T10Aa overlap with the plurality of first branch gates T10Gb.

In this embodiment, since the first output transistor T10 is a double-gate transistor, both the first gate T10G and the fifth gate T10H of the first output transistor T10 can serve as switches of the first output transistor T10. In addition, the fifth gate T10H may serve as a shielding layer for the first active part T10A, so as to perform ion doping on the first active part T10A. Therefore, the part of the first active part T10A overlapping with the plurality of first branch gates T10Gb is the channel part of the first active part T10A. Parts of the first active part T10A that do not overlap with the plurality of first branch gates T10Gb are source connection parts and drain connection parts on both sides of the channel part. For example, in the structures of FIG. 13 and FIG. 14, the first active part T10A overlaps with four first branch gates T10Gb, and the first active part T10A has four channel parts.

In this embodiment, the first output transistor T10 is a metal-oxide-semiconductor transistor, and this type of transistor has the advantage of low leakage current, but its mobility is small. Therefore, in order to increase the mobility of the first output transistor T10, it is necessary to increase the width of the channel part in the first active part T10A. That is, it corresponds to the width of the first sub-active part T10Aa in the second direction Y. Therefore, in the second direction Y, the width of the first sub-active part T10Aa is larger than the width of the second sub-active part T9Aa.

In addition, when the width of the first active part T10A in the second direction Y is too large, static electricity may be concentrated on the first active part T10A. This may cause the first active part T10A to be damaged by static electricity. Therefore, in the present application, the first active part T10A can be configured as two first sub-active parts T10Aa that are separately arranged.

Referring to FIG. 13 and FIG. 14, the second active layer 129 further includes an active part T1A of the second inverting transistor T1, an active part T13A of the first cascade transistor T13, and an active part T14A of the regulation transistor T14, active parts of the second inverting transistor T1, the first cascade transistor T13, and the regulation transistor T14 are arranged vertically to the gates of the corresponding transistors and have overlapping parts with the gates of the corresponding transistors. The overlapping part is the channel part of the corresponding active part. In addition, in order to improve the mobility of metal oxide semiconductor transistors, in the signal generation module 10, the channel widths of the active parts in the second inverting transistor T1, the first cascade transistor T13, and the regulation transistor T14 are all greater than the channel widths of the active parts of the pull-up transistor T2, the first inverting transistor T3, the first feedback transistor T4, the second feedback transistor T5, the second filter transistor T8, the first filter transistor T11, and the second cascade transistor T12.

In the structures of FIG. 13 and FIG. 14, the first output transistor T10 is a metal oxide semiconductor transistor, and the second output transistor T9 and the third output transistor T6 are low temperature polysilicon semiconductor transistors. The metal oxide semiconductor transistor has low mobility. Therefore, in order to improve the mobility of the first output transistor T10, the first gate T10G and the fifth gate T10H of the first output transistor T10 are provided with two trunk gates. The two ends of the plurality of branch gates are connected together so that the electric field formed by the newly added trunk gates further drives the migration of electrons in the active part.

In this embodiment, the distance between the first trunk gate T10Ga, the fifth trunk gate T10Ha and the first active part T10A in the second direction Y is the first distance. The distance between the end of the second branch gate T9Gb away from the second trunk gate T9Ga and the second active part T9A in the second direction Y is the second distance. The distance between the end of the third branch gate T6Gb away from the third trunk gate T6Ga and the third active part T6A in the second direction Y is the third distance. The first distance is greater than the second distance, and the second distance is greater than or equal to the third distance.

In this embodiment, the first distance may be greater than 5 microns, the second distance may be greater than 2.5 microns, and the third distance may be greater than 2.5 microns.

Figure 15:
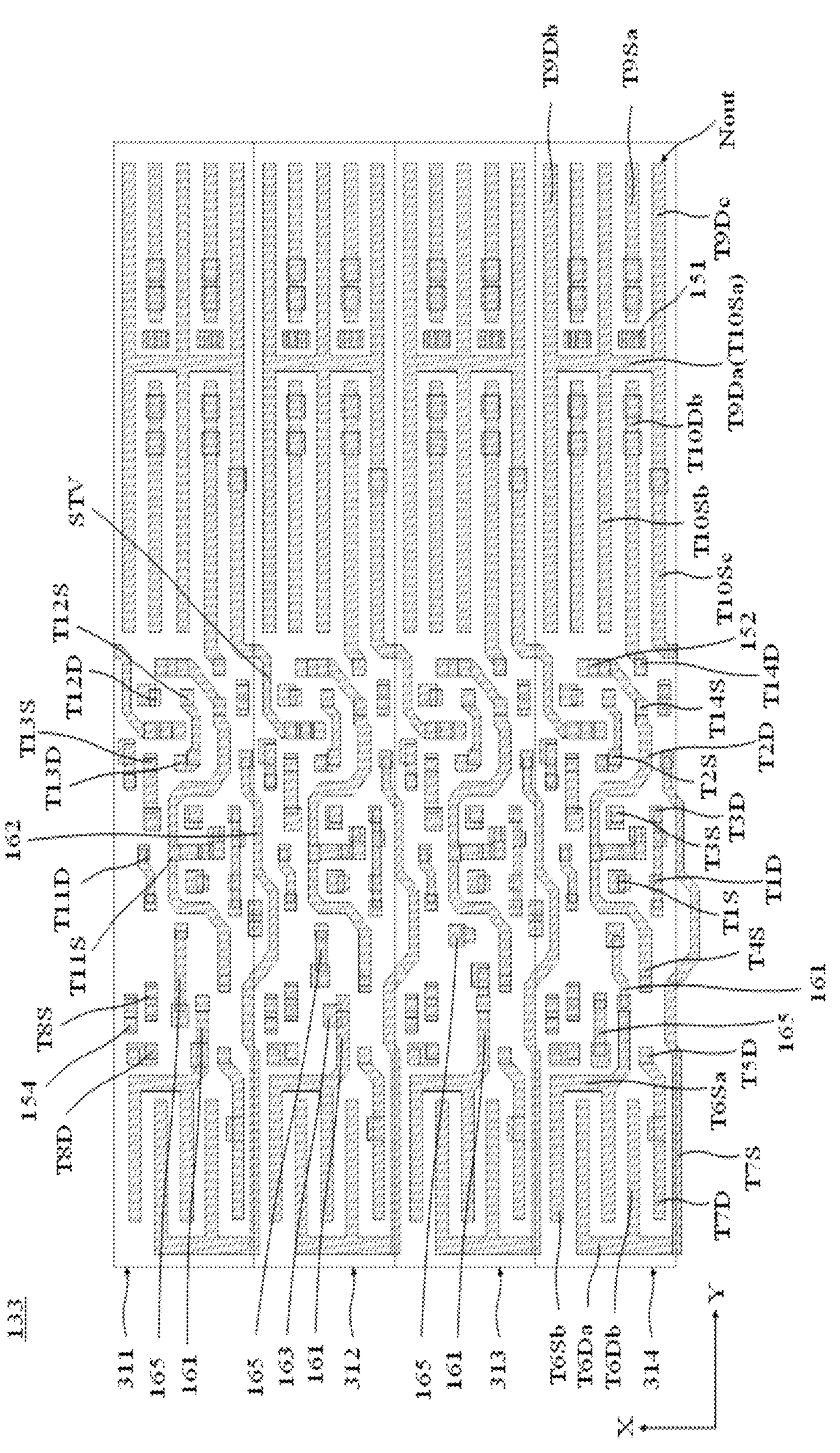
FIG. 15 is a film layer diagram of a first source-drain layer in a display panel of the present application.

Referring to FIG. 15, FIG. 15 is a film layer diagram of the first source-drain layer 133 in the display panel 100 of the present application.

In this embodiment, the array driving layer 120 further includes a first source-drain layer 133 disposed on a side of the third gate layer 131 away from the second gate layer 127. The first source-drain layer 133 includes a first source T10S, a first drain T10D, a second source T9S, and a second drain T9D.

In this embodiment, the first source T10S includes a first trunk source T10Sa and a plurality of first branch sources T10Sb arranged at intervals and in parallel. The first drain T10D includes a plurality of first branch drains T10Db. The first trunk source T10Sa extends along the first direction X, and the first branch source T10Sb extends along the second direction Y. A side of the plurality of first branch sources T10Sb away from the signal generation module 10 is connected to the first trunk source T10Sa. The plurality of first branch drains T10Db extend along the second direction Y, and the plurality of first branch drains T10Db are disposed between the plurality of first branch sources T10Sb.

In this embodiment, in the top view direction of the display panel 100, two first branch sources T10Sb on two sides of the plurality of first branch sources T10Sb are disposed on two sides of the first gate T10G. Among the plurality of first branch sources T10Sb, at least one first branch source T10Sb and the plurality of first branch drains T10Db are disposed between the plurality of first branch gates T10Gb. For example, in the structure of FIG. 15, the first source T10S includes one first trunk source T10Sa and three first branch sources T10Sb. The first drain T10D includes two first branch drains T10Db. Three first branch sources T10Sb and two first branch drains T10Db are arranged at intervals in the first direction X. That is, the two first branch drains T10Db may be disposed between two adjacent first branch sources T10Sb. In addition, the two outermost first branch sources T10Sb among the three first branch sources T10Sb are disposed on both sides of the first gate T10G. One first branch source T10Sb and two first branch drains T10Db are disposed between the plurality of first branch gates T10Gb.

In this embodiment, the second drain T9D includes a second trunk drain T9Da and a plurality of second branch drains T9Db arranged at intervals and in parallel. The second source T9S includes a plurality of second branch sources T9Sb. The second main drain T9Da extends along the first direction X. The second branch drain T9Db extends along the second direction Y. The plurality of second branch drains T9Db are connected to the second trunk drain T9Da on a side close to the signal generation module 10. The plurality of second branch sources T9Sb extends along the second direction Y. A plurality of second branch sources T9Sb are disposed between the plurality of second branch drains T9Db, and the first trunk source T10Sa is connected to the second trunk drain T9Da.

In this embodiment, in the top view direction of the display panel 100, two second branch drains T9Db on two sides of the plurality of second branch drains T9Db are disposed on two sides of the second gate T9G. The inner at least one second branch drain T9Db and the plurality of second branch sources T9Sb among the plurality of second branch drains T9Db are disposed between the plurality of second branch gates T9Gb. For example, in the structure of FIG. 15, the second source T9S includes two second branch sources T9Sb. The second drain T9D includes one second trunk drain T9Da and three second branch drains T9Db. Two second branch sources T9Sb and three second branch drains T9Db are arranged at intervals in the first direction X. That is, the two second branch sources T9Sb may be arranged between two adjacent second branch drains T9Db. In addition, the two outermost second branch drains T9Db among the three second branch drains T9Db are disposed on both sides of the second gate T9G. One second branch drain T9Db and two second branch sources T9Sb are arranged between the plurality of second branch gates T9Gb.

In this embodiment, both the first trunk source T10Sa and the second trunk drain T9Da overlap with the first trunk gate T10Ga on the side away from the signal generation module 10. That is, the first trunk source T10Sa and the second trunk drain T9Da may share one trunk electrode.

In this embodiment, the mobility of the first output transistor T10 is relatively low. In order to improve the driving capability of the first output transistor T10, the present application increases the electron mobility in the first output transistor T10 by increasing the width of the channel in the first active part T10A. In order to enable the data signal to be transmitted from the source of the transistor to the drain of the transistor as soon as possible, the present application increases the electron mobility in the first output transistor T10 by increasing the width of the channel in the first active part T10A. In addition, the first branch source T10Sb is electrically connected to the source connection part in the first sub-active part T10Aa through a plurality of source contact holes. The first branch drain T10Db is electrically connected to the drain connection part in the first sub-active part T10Aa through a plurality of drain contact holes. Therefore, in the second direction Y, the length of the first branch source T10Sb is greater than the length of the second branch drain T9Db.

Figure 16:
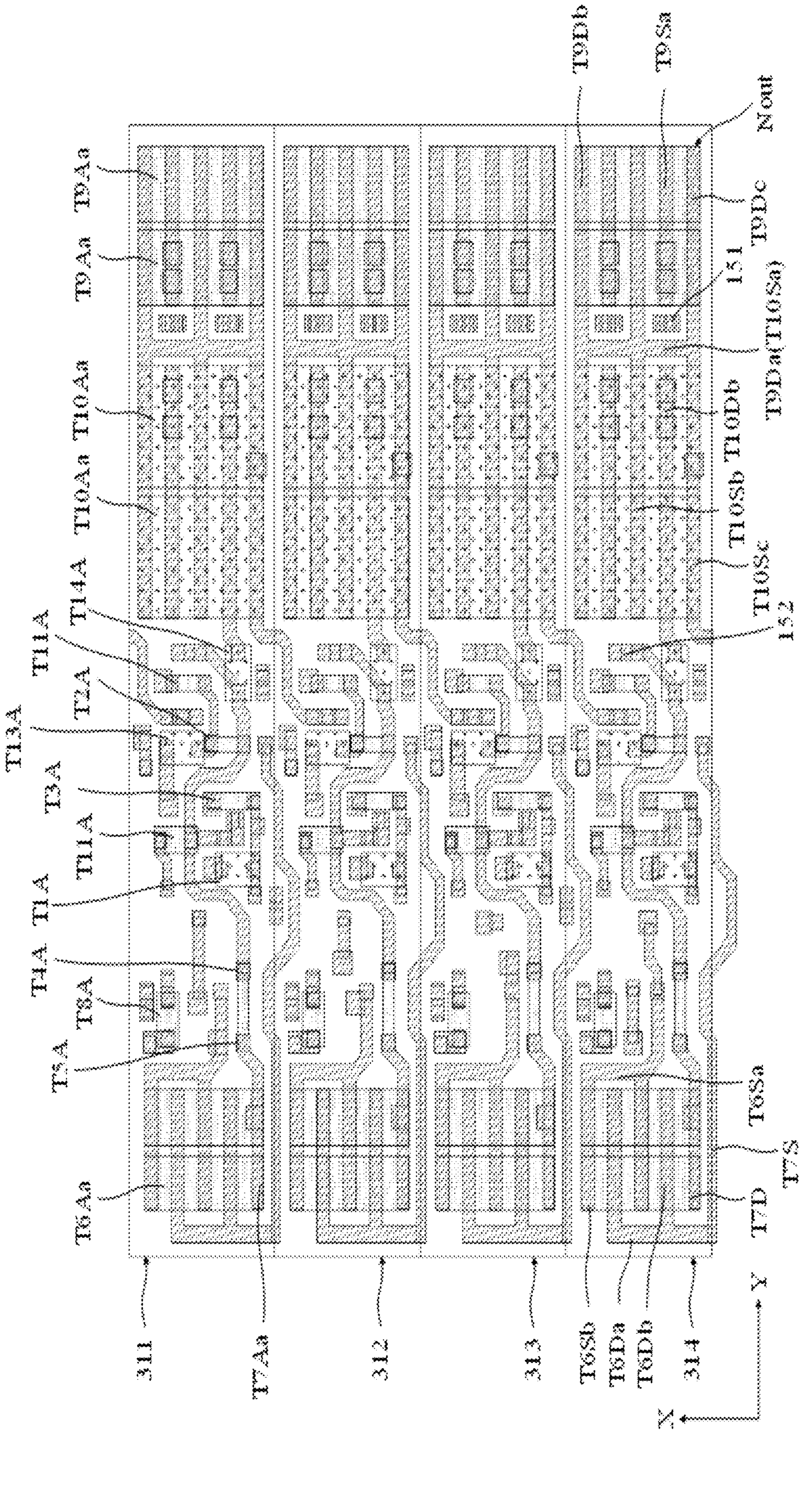
FIG. 16 is a film layer diagram of a superposition of a first active layer, a second active layer, and a first source-drain layer in a display panel of the present application.

Referring to FIG. 16, FIG. 3 is a film layer diagram of a superposition of the first active layer 123, the second active layer 129, and the first source-drain layer 133 of the display panel 100 of the present application.

In this embodiment, each first branch source T10Sb is electrically connected to the source connection part in the first sub-active part T10Aa through four contact holes of the first source T10S. Each first branch drain T10Db is electrically connected to the drain connection part in the first sub-active part T10Aa through four contact holes of the first drain T10D. Each second branch drain T9Db is electrically connected to the drain connection part in the first sub-active part T10Aa through three contact holes of the second drain T9D. Each first branch source T10Sb is electrically connected to the source connection part in the first sub-active part T10Aa through three contact holes of the second source T9S.

In this embodiment, the first source T10S contact hole and the first drain T10D contact hole penetrate through the first interlayer insulating layer 132 and the fourth gate insulating layer 130. The second source T9S contact hole and the second drain T9D contact hole penetrate the first interlayer insulating layer 132, the fourth gate insulating layer 130, the third gate insulating layer 128, the second gate insulating layer 126, and the first gate insulating layer 124.

The first gate T10G of the first output transistor T10 is electrically connected to the second gate T9G of the second output transistor T9. The first gate T10G is on the first gate layer 125, and the second gate T9G is on the second gate layer 127. Therefore, in order to electrically connect the first gate T10G and the second gate T9G, it is necessary to leave a certain distance between the end of the second branch source T9Sb close to the signal generation module 10 and the second trunk drain T9Da, so as to set the first connection section 151 connecting the first gate T10G and the second gate T9G.

Referring to FIG. 15, the distance between the first branch drain T10Db away from the end of the signal generation module 10 and the first trunk source T10Sa is less than the distance between the second branch source T9Sb close to one end of the signal generation module 10 and the second trunk drain T9Da.

In this embodiment, referring to FIG. 15, the first source-drain layer 133 further includes a first connection section 151. The first connection section 151 is disposed between the end of the second branch source T9Sb close to the signal generation module 10 and the second trunk drain T9Da. In addition, referring to FIG. 10, the third gate layer 131 further includes a first protrusion part 141 disposed on the fifth trunk gate T10Ha on a side away from the signal generation module 10. The first protrusion part 141 is connected to the fifth trunk gate T10Ha, and the first protrusion part 141 extends to a side away from the signal generation module 10.

In this embodiment, the first end of the first connection section 151 overlaps with the first protrusion part 141 and the second trunk gate T9Ga. The second end of the first connection section 151 overlaps with the second trunk gate T9Ga. The first end of the first connection section 151 is electrically connected to the first protrusion part 141 through the first via hole HL1. The second end of the first connection section 151 is electrically connected to the second trunk gate T9Ga through the second via hole HL2. That is, the first end of the first connection section 151 is electrically connected to the fifth gate T10H. The second end of the first connection section 151 is electrically connected to the second gate T9G. The first gate T10G is electrically connected to the fifth gate T10H, therefore, the second gate T9G is electrically connected to the first gate T10G through the fifth gate T10H.

In the structures of FIG. 10 and FIG. 15, the third gate layer 131 includes two first protrusion parts 141. The first source-drain layer 133 may include two first connection connections 151. In order to avoid disconnection of the second gate T9G and the fifth gate T10H, the two first protrusion parts 141 are electrically connected to the corresponding first connection sections 151.

In this embodiment, the first via hole HL1 penetrates through the first interlayer insulating layer 132, the second via hole HL2 penetrates through the first interlayer insulating layer 132, the fourth gate insulating layer 130, the third gate insulating layer 128, and the second gate insulating layer 126.

The first gate T10G and the fifth gate T10H in the first output transistor T10 are electrically connected. The first gate T10G is in the first gate layer 125, and the fifth gate T10H is in the third gate layer 131. Therefore, in order to electrically connect the first gate T10G and the fifth gate T10H, in the present application, a connection section connecting the first gate T10G and the fifth gate T10H may be provided on the side of the first branch drain T10Db close to the signal generation module 10.

Referring to FIG. 15, the first source-drain layer 133 further includes a second connection section 152. The second connection section 152 is disposed on a side of the first branch drain T10Db close to the signal generation module 10. Referring to FIG. 8 and FIG. 9, the second gate layer 127 further includes a second protrusion part 142 disposed on a side close to the signal generation module 10. The second protrusion part 142 is connected to the first trunk gate T10Ga. The second protrusion part 142 extends toward a side close to the signal generation module 10. Referring to FIG. 10, the third gate layer 131 may further include a third protrusion part 143 disposed on a side close to the signal generation module 10. The third protrusion part 143 is connected to the fifth trunk gate T10Ha, and the third protrusion part 143 extends toward a side close to the signal generation module 10.

In this embodiment, a first end of the second connection section 152 overlaps with the second protrusion part 142. A second end of the second connection section 152 overlaps with the third protrusion part 143. The first end of the second connection section 152 is electrically connected to the third protrusion part 143 through the third via hole HL3. The second end of the second connection section 152 is electrically connected to the second protrusion part 142 through the fourth via hole HL4. That is, the first end of the second connection section 152 is electrically connected to the fifth gate T10H. The second end of the second connection section 152 is electrically connected to the first gate T10G. The arrangement of the first connection section 151 and the second connection section 152 electrically connects the first gate T10G, the second gate T9G, and the fifth gate T10H together.

In the display panel 100 of the present application, the plurality of first branch source electrodes T10Sb include the first bottom electrode T10Sc close to the next stage GOA unit 310. The plurality of second branch drains T9Db include a second bottom electrode T9Dc close to the next stage GOA unit 310. Both the first bottom electrode T10Sc and the second bottom electrode T9Dc are electrically connected to the first signal output terminal Nout.

Referring to FIG. 15, the first source T10S includes three first branch sources T10Sb. Among the three first branch sources T10Sb, the first branch source T10Sb close to the next stage GOA unit 310 is the first bottom electrode T10Sc. The second drain T9D includes three second branch drains T9Db. Among the three second branch drains T9Db, the second branch drain T9Db close to the next stage GOA unit 310 is the second bottom electrode T9Dc. The first bottom electrode T10Sc and the second bottom electrode T9Dc are electrically connected. Secondly, the end of the second bottom electrode T9Dc away from the signal generation module 10 is electrically connected to the first signal output terminal Nout, so as to transmit the first gate driving signal to the display part 200.

Referring to FIG. 15, the first source-drain layer 133 may further include a third source T6S, a third drain T6D, a fourth source T7S, and a fourth drain T7D.

In this embodiment, the third source T6S may include a third trunk source T6Sa and two third branch sources T6Sb arranged in parallel and spaced apart. One end of the two third branch sources T6Sb close to the signal generation module 10 is connected to the third trunk source T6Sa. The third drain T6D includes a third trunk drain T6Da and two third branch drains T6Db arranged in parallel and spaced apart. One end of the two third branch drains T6Db close to the signal generation module 10 is connected to the third trunk drain T6Da. The two third branch sources T6Sb and the two third branch drains T6Db are alternately arranged in the first direction X.

In this embodiment, the fourth source T7S and the fourth drain T7D extend along the second direction Y. The fourth drain T7D is disposed next to the third branch drain T6Db. The fourth source T7S is disposed on a side of the fourth drain T7D away from the third branch drain T6Db. The first end of the fourth source T7S is connected to the third trunk drain T6Da.

Referring to FIG. 15, the fourth source T7S further includes a second extension section 162 extending along the second direction Y. Part of the second extension section 162 is located in the GOA unit 310 of the current stage, and part of the second extension section 162 is located in the GOA unit 310 of the next stage. In addition, referring to FIG. 7, the first gate layer 125 further includes output wires 170 extending along the second direction Y. The output wire 170 is disposed on a side of the first bottom electrode T10Sc of the first source T10S away from the first branch drain T10Db. The second end of the fourth source T7S is electrically connected to the first end of the second extension section 162. The second end of the second extension section 162 is connected to the first end of the output wire 170 through the tenth via hole HL10. The second end of the output wire 170 is connected to the second signal output end Pout.

In this embodiment, the tenth via hole HL10 penetrates through the first interlayer insulating layer 132, the fourth gate insulating layer 130, the third gate insulating layer 128, and the second gate insulating layer 126. The second signal output terminal Pout is configured to output the second gate driving signal.

Figure 17:
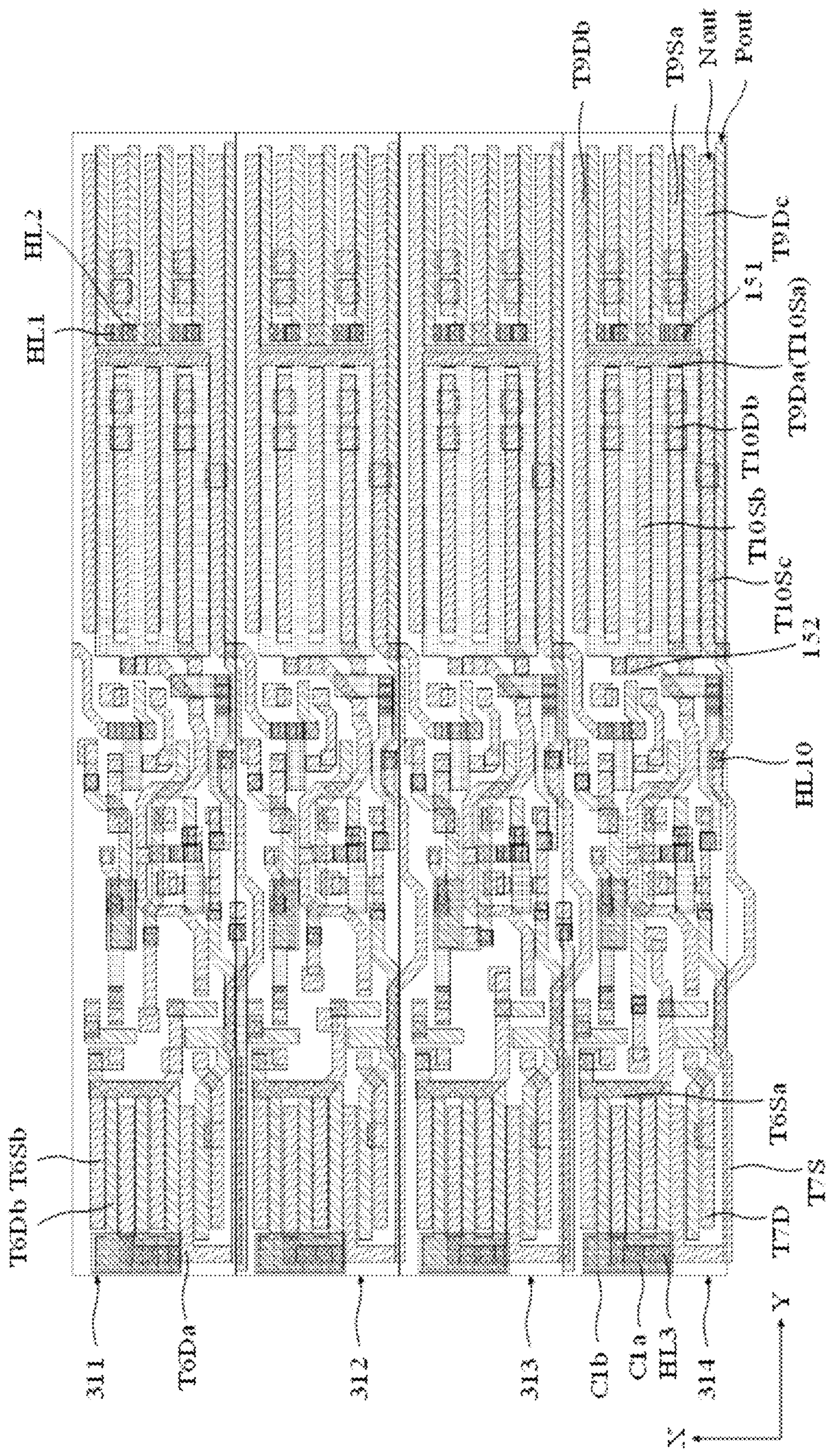
FIG. 17 is a film layer diagram of a superposition of a first gate layer, a second gate layer, and a first source-drain layer of the present application.

Referring to FIG. 17, FIG. 17 is a film layer diagram of a superposition of the first gate layer 125, the second gate layer 127, and the first source-drain layer 133 of the present application.

Referring to FIG. 8 and FIG. 17, the second plate C1*b* of the first storage capacitor C1 and the third trunk drain T6Da have overlapping parts. The second plate C1*b* is electrically connected to the third trunk drain T6Da through the third via hole HL3. The third via hole HL3 penetrates through the first interlayer insulating layer 132, the fourth gate insulating layer 130, and the third gate insulating layer 128.

Referring to FIG. 15 and FIG. 16, the first source-drain layer 133 also includes the source T2S and the drain T2D of the pull-up transistor T2, the source T3S and the drain T3D of the first inverting transistor T3, the source T4S and the drain of the first feedback transistor T4, the source and drain T5D of the second feedback transistor T5, the source T8S and the drain T8D of the second filter transistor T8, the source T11S and the drain T11D of the first filter transistor T11, the source T12S and the drain T12D of the second cascade transistor T12, the source T1S and the drain T1D of the second inverting transistor T1, the source T13S and the drain T13D of the first cascade transistor T13, and the source T14S and the drain T14D of the regulation transistor T14. The source and drain of the above transistors are both arranged on both sides of the corresponding active part.

In this embodiment, the drain T3D of the first inverting transistor T3 and the source T1S of the second inverting transistor T1 extend along the second direction Y and are connected. The drain T2D of the pull-up transistor T2, the source T11S of the first filter transistor T11, the source T4S of the first feedback transistor T4 and the second connection section 152 are connected to each other.

In this embodiment, referring to FIG. 15, the first source-drain layer 133 further includes a start signal line STV. The first end of the start signal line STV is connected to the first bottom electrode T10Sc in the upper stage GOA unit 310. The second end of the start signal line STV is electrically connected to the gate of the first cascade transistor T13 and the gate of the second stage transistor T12 in the current stage.

Figure 18:
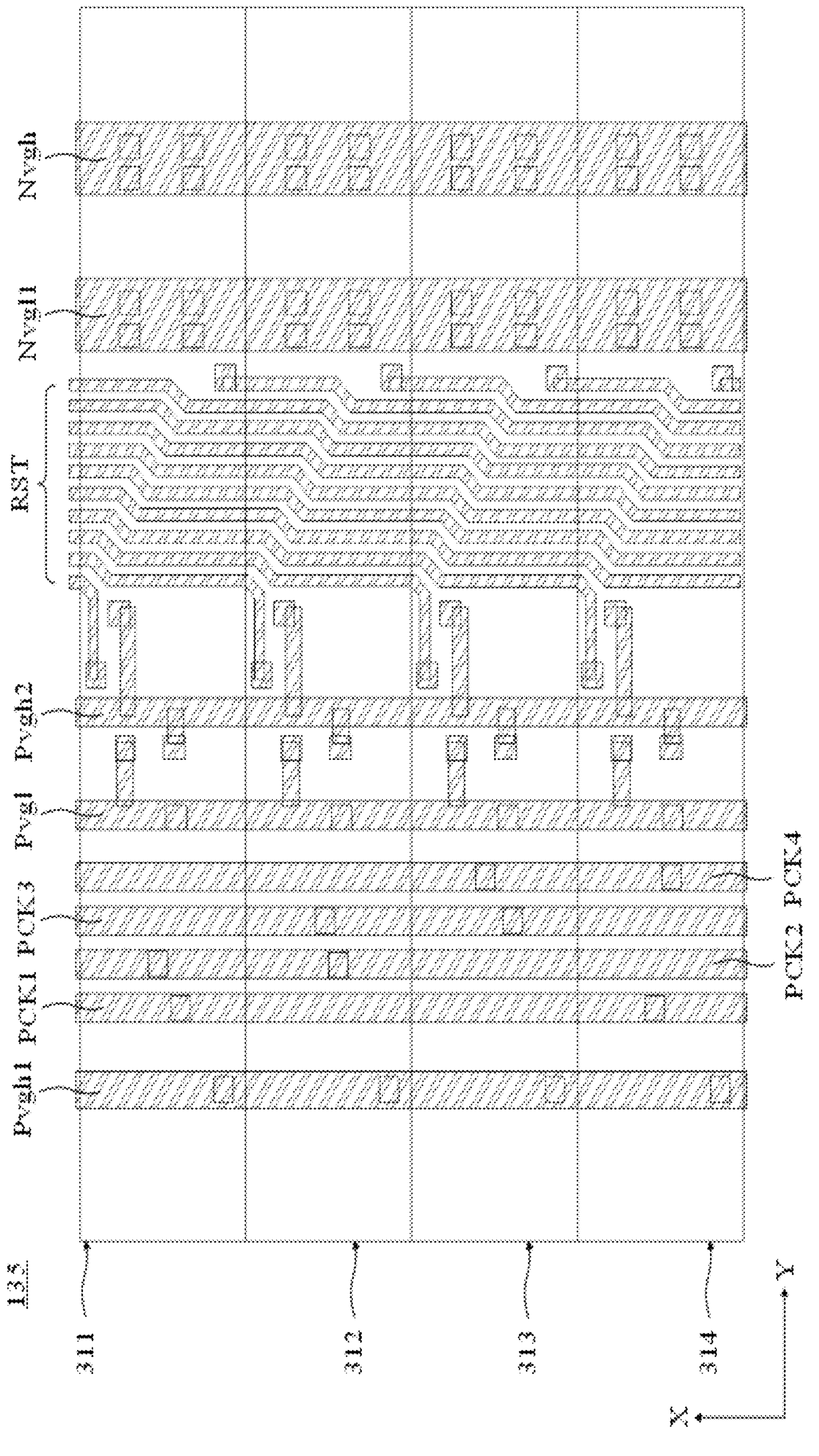
FIG. 18 is a film layer diagram of a second source-drain layer in a display panel of the present application.

Referring to FIG. 18, FIG. 18 is a film layer diagram of the second source-drain layer 135 in the display panel 100 of the present application.

In this embodiment, the array driving layer 120 further includes a second source-drain layer 135 disposed on a side of the first source-drain layer 133 away from the base substrate 110. The second source-drain layer 135 includes a first high potential line Nvgh. The first high potential line Nvgh extends in the first direction X. The first high potential line Nvgh overlaps with the plurality of second branch sources T9Sb and the plurality of second branch drains T9Db in each GOA unit 310. The first high potential line Nvgh is electrically connected to the plurality of second branch sources T9Sb in each GOA unit 310 through the fifth via hole HL5.

Figure 19:
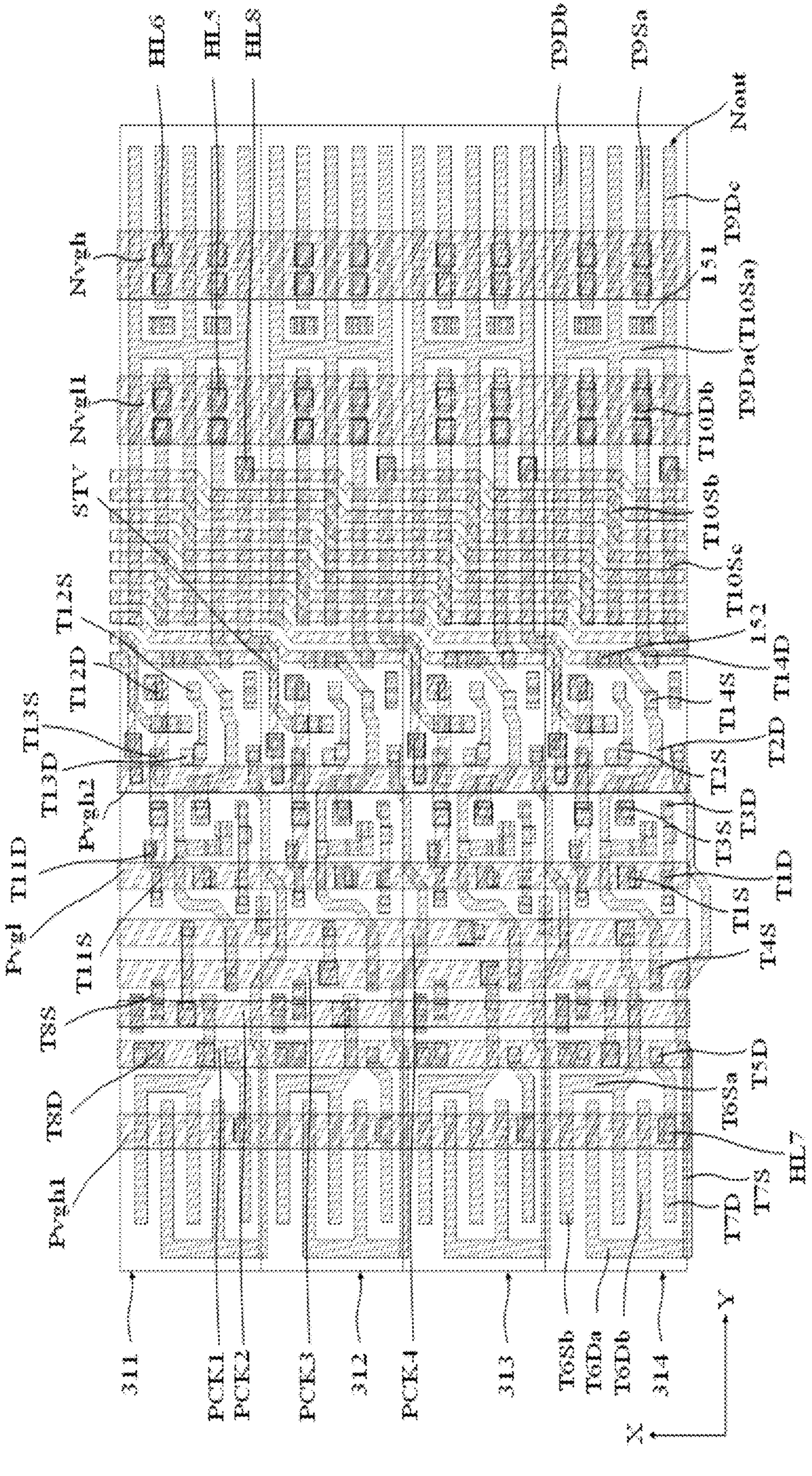
FIG. 19 is a film layer diagram of a first source-drain layer and a second source-drain layer in a display panel of the present application.

Referring to FIG. 19, FIG. 19 is a film layer diagram of the first source-drain layer 133 and the second source-drain layer 135 in the display panel 100 of the present application. The first high potential line Nvgh is electrically connected to the two second branch sources T9Sb in each stage of GOA unit 310. The first high potential line Nvgh is electrically connected to one second branch source T9Sb through two fifth via holes HL5. The fifth via hole HL5 penetrates through the second interlayer insulating layer 134.

Referring to FIG. 18 and FIG. 19, the second source-drain layer 135 further includes a first low potential line Nvgl1. The first low potential line Nvgl1 and the first high potential line Nvgh are arranged opposite to and parallel to each other. The first low potential line Nvgl1 overlaps the multiple first branch sources T10Sb and the multiple first branch drains T10Db in each GOA unit 310. The first low potential line Nvgl1 is electrically connected to the plurality of first branch drains T10Db in each GOA unit 310 through the sixth via hole HL6. For example, the first low potential line Nvgl1 is electrically connected to the two first branch drains T10Db in each stage of the GOA unit 310. The first low potential line Nvgl1 is electrically connected to one first branch drain T10Db through two sixth via holes HL6. The sixth via hole HL6 penetrates through the second interlayer insulating layer 134.

Figure 20:
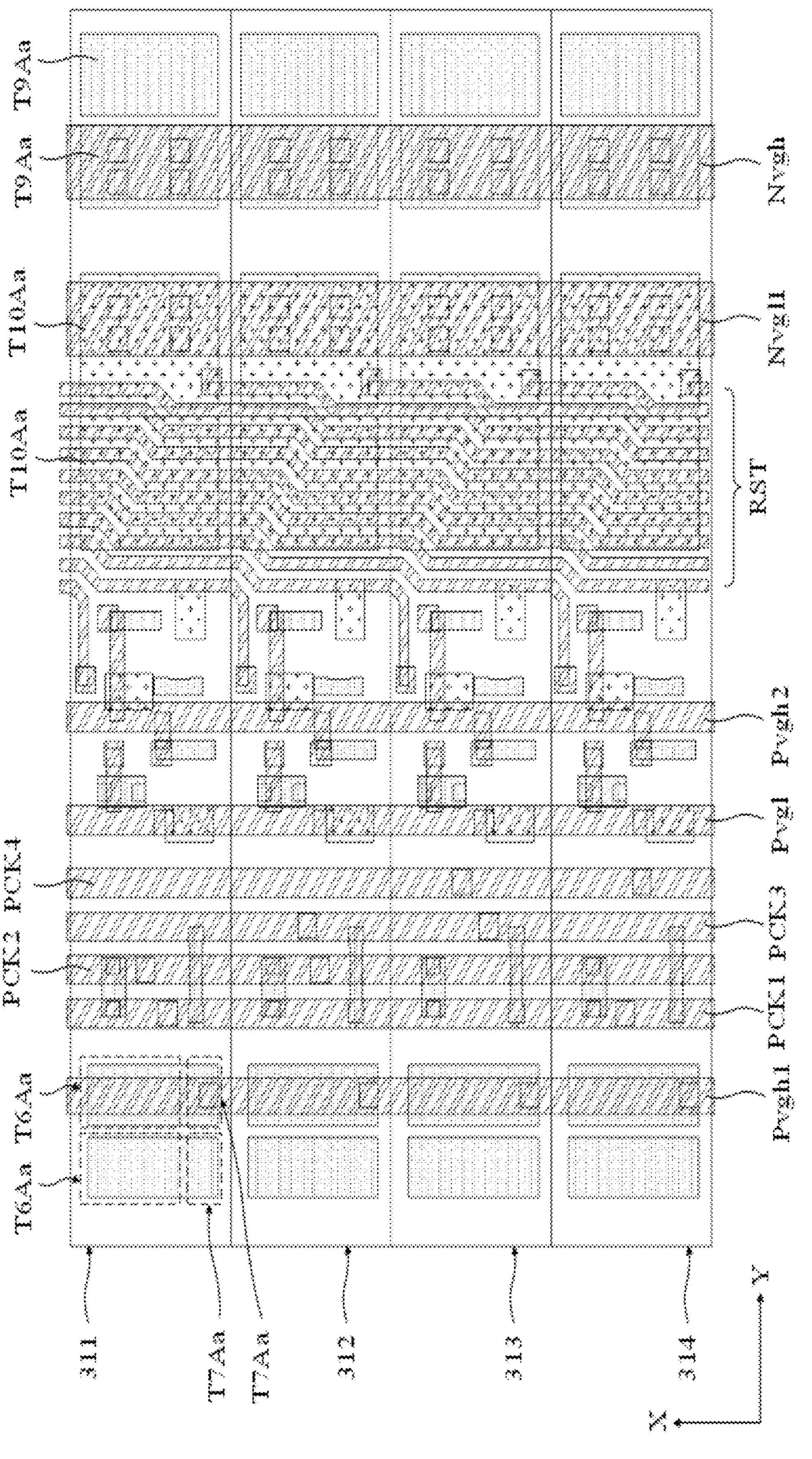
FIG. 20 is a film layer diagram of a superposition of a first active layer, a second active layer, and a second source-drain layer in a display panel of the present application.

Referring to FIG. 20, FIG. 20 is a film layer diagram of a superposition of the first active layer 123, the second active layer 129, and the second source-drain layer 135 in the display panel 100 of the present application.

In this embodiment, in order to avoid the voltage of the first high potential line Nvgh from interfering with the voltage of the signal lines in the display part 200, in this application, the first high potential line Nvgh may be overlapped with the second sub-active part T9Aa on the side close to the signal generation module 10. In addition, in order to leave enough space to arrange the reset signal line RST, the first low potential line Nvgl1 may overlap the first sub active part T10Aa on a side away from the signal generation module 10.

Referring to FIG. 18 to FIG. 20, the second source-drain layer 135 further includes a second high potential line Pvgh1. The second high potential line Pvgh1 is opposite to and parallel to the first high potential line Nvgh. The second high potential line Pvgh1 overlaps the third sub-active part T6Aa and the fourth sub-active part T7Aa on the side close to the signal generation module 10. The second high potential line Pvgh1 is electrically connected to the fourth drain T7D through the seventh via hole HL7. The first via hole HL1 penetrates through the second interlayer insulating layer 134.

In FIG. 18 to FIG. 20, in the second direction Y, the width of the first high potential line Nvgh is equal to the width of the first low potential line Nvgl1. The width of the first high potential line Nvgh is larger than the width of the second high potential line Pvgh1. The first high potential line Nvgh and the first low potential line Nvgl1 are mainly used to provide a high potential signal and a low potential signal to the first output module 20 respectively. In addition to outputting gate driving signals to the display unit 200, the first output module 20 also needs to output cascade transmission signals to the next stage GOA unit 310. Therefore, the output load of the first output module 20 is higher than the output load of the second output module 30. Therefore, the output loads of the first high potential line Nvgh and the first low potential line Nvgl1 are both larger than the output loads of the second high potential line Pvgh1 and the second low potential line Pvgl. Therefore, the widths of the first high potential line Nvgh and the first low potential line Nvgl1 of the present application are larger than the widths of the second high potential line Pvgh1 and the second low potential line Pvgl.

Referring to FIG. 18 to FIG. 20, the second source-drain layer 135 may further include a second low potential line Pvgl and a third high potential line Pvgh2 overlapping with the signal generation module 10. The second low potential line Pvgl, the third high potential line Pvgh2, and the second high potential line Pvgh1 are arranged in parallel and at intervals. The second low potential line Pvgl is disposed between the second high potential line Pvgh1 and the third high potential line Pvgh2. Widths of the third high potential line Pvgh2, the second high potential line Pvgh1, and the second low potential line Pvgl are all equal.

Referring to FIG. 18 to FIG. 20, the second source-drain layer 135 further includes a first clock signal line CK and a second clock signal line XCK overlapping with the signal generation module 10. The first clock signal line CK and the second clock signal line XCK are arranged parallel to and spaced apart from the second high potential line Pvgh1. The first clock signal line CK and the second clock signal line XCK are disposed between the second high potential line Pvgh1 and the second low potential line Pvgl.

In this embodiment, in the display panel 100 of the present application, the gate driving circuit 300 includes a plurality of repeating units. Each repeating unit includes at least four GOA units 310. Taking four GOA units 310 as an example below as a repeating unit, multiple repeating units are arranged in the first direction X.

Figure 21:
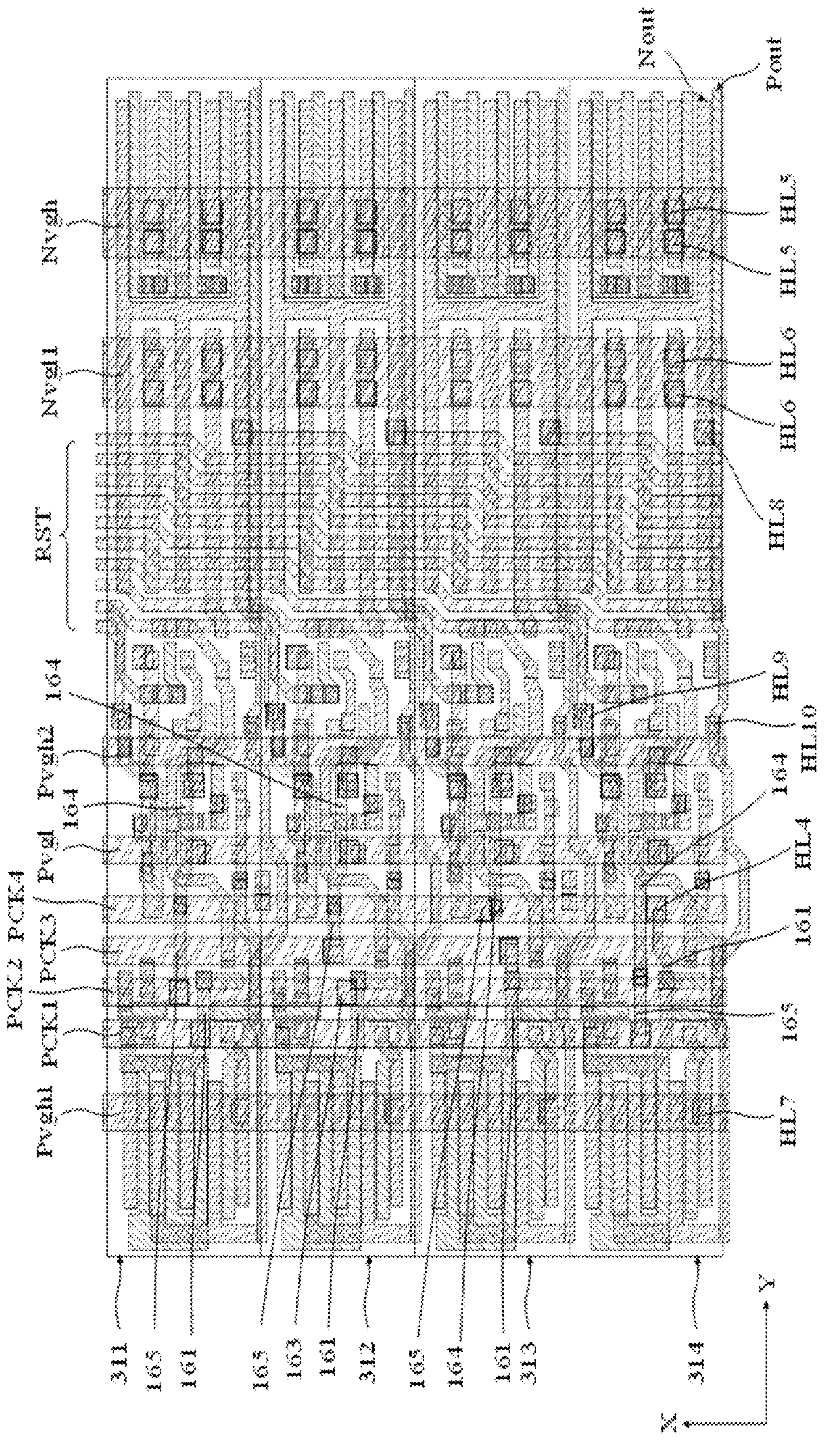
FIG. 21 is a film layer diagram of a superposition of a first gate layer, a first source-drain layer, and a second source-drain layer in a display panel of the present application.

Referring to FIG. 21, FIG. 21 is a film layer diagram of a superposition of the first gate layer 125, the first source-drain layer 133, and the second source-drain layer 135 in the display panel 100 of the present application.

In this example, the repeating unit may include a first GOA unit 311, a second GOA unit 312, a third GOA unit 313, and a fourth GOA unit 314 arranged in sequence along the first direction X. The display panel 100 may include a first clock signal line PCK1, a second clock signal line PCK2, a third clock signal line PCK3, and a fourth clock signal line PCK4 arranged along the second direction Y. Every two clock signal lines are connected to one GOA unit 310.

In this embodiment, the first clock signal line PCK1 and the second clock signal line PCK2 are connected to the first GOA unit 311. The first clock signal line PCK1 is the first clock signal line CK of the first GOA unit 311. The second clock signal line PCK2 is the second clock signal line XCK of the first GOA unit 311. That is, the first clock signal line PCK1 is connected to the gate of the third output transistor T6 in the first GOA unit 311. The second clock signal line PCK2 is connected to the gate of the pull-up transistor T2 in the first GOA unit 311.

In this embodiment, the second clock signal line PCK2 and the third clock signal line PCK3 are connected to the second GOA unit 312. The second clock signal line PCK2 is the first clock signal line CK of the first GOA unit 311. The third clock signal line PCK3 is the second clock signal line XCK of the first GOA unit 311. That is, the second clock signal line PCK2 is connected to the gate of the third output transistor T6 in the first GOA unit 311. The third clock signal line PCK3 is connected to the gate of the pull-up transistor T2 in the first GOA unit 311.

In this embodiment, the third clock signal line PCK3 and the fourth clock signal line PCK4 are connected to the third GOA unit 313. The third clock signal line PCK3 is the first clock signal line CK of the first GOA unit 311. The fourth clock signal line PCK4 is the second clock signal line XCK of the first GOA unit 311. That is, the third clock signal line PCK3 is connected to the gate of the third output transistor T6 in the first GOA unit 311. The fourth clock signal line PCK4 is connected to the gate of the pull-up transistor T2 in the first GOA unit 311.

In this embodiment, the fourth clock signal line PCK4, the first clock signal line PCK1, and the fourth GOA unit 314 are connected. The fourth clock signal line PCK4 is the first clock signal line CK of the first GOA unit 311. The first clock signal line PCK1 is the second clock signal line XCK of the first GOA unit 311. That is, the fourth clock signal line PCK4 is connected to the gate of the third output transistor T6 in the first GOA unit 311. The fourth clock signal line PCK4 is connected to the gate of the pull-up transistor T2 in the first GOA unit 311.

Referring to FIG. 15 and FIG. 21, the first source-drain layer 133 in each stage of GOA unit 310 further includes a first extension part 161 connected to the third source T6S. The first extension section 161 extends along the second direction Y, and the first extension section 161 is located in the area where the signal generation module 10 is located. The first clock signal line CK in each stage of GOA unit 310 is electrically connected to the first extension section 161 through the fourth via hole HL4. The fourth via hole HL4 penetrates through the second interlayer insulating layer 134.

In this embodiment, the third output transistors T6 in the first GOA unit 311, the second GOA unit 312, the third GOA unit 313, and the fourth GOA unit 314 are connected to different clock signal lines. Therefore, among the repeating units, the lengths of the first extension sections 161 in some GOA units 310 in the first direction X are different. That is, the lengths of the first extension sections 161 in the first GOA unit 311, the second GOA unit 312, the third GOA unit 313, and the fourth GOA unit 314 are different. For example, the lengths of the first extension sections 161 in the first GOA unit 311 and the second GOA unit 312 are equal. The lengths of the first extension sections 161 in the second GOA unit 312, the third GOA unit 313, and the fourth GOA unit 314 gradually increases.

In this embodiment, in the second GOA unit 312, both the gate of the first feedback transistor T4 and the third output transistor T6 are connected to the second clock signal line PCK2, and the positions of the two connections are close to each other. Therefore, in order to avoid interference between the two, the first source-drain layer 133 in the second GOA unit 312 further includes a third extension section 163. The third extension section 163 extends along the first direction X, and the second clock signal line PCK2 is electrically connected to the first extension section 161 through the third extension section 163.

In this embodiment, referring to FIG. 7, the first gate layer 125 in each stage of GOA unit 310 further includes a fourth extension section 164 connected to the gate of the pull-up transistor T2. The fourth extension section 164 extends along the second direction Y. That is, the fourth extension section 164 mainly extends to a side away from the first output module 20. In addition, referring to FIG. 15 and FIG. 21, the first source-drain layer 133 in each stage of GOA unit 310 further includes a fifth extension section 165. The fifth extension section 165 extends along the second direction Y. The first end of the fifth extension section 165 is connected to the second clock signal line XCK in the corresponding GOA unit 310. The second end of the fifth extension section 165 is electrically connected to the fourth extension section 164.

In FIG. 7, FIG. 15, and FIG. 21, the length of the fifth extension sections 165 in the first GOA unit 311, the second GOA unit 312, and the third GOA unit 313 gradually decreases. The length of the fifth extension section 165 in the fourth GOA unit 314 is increased compared to the length of the fifth extension section 165 in the third GOA unit 313. In addition, the lengths of the fourth extension sections 164 in the first GOA unit 311, the second GOA unit 312, and the third GOA unit 313 are equal. The length of the fourth extension section 164 in the fourth GOA unit 314 is longer than the length of the fourth extension section 164 in the third GOA unit 313.

In FIG. 7, FIG. 15, and FIG. 21, the pull-up transistors T2 in the first GOA unit 311, the second GOA unit 312, the third GOA unit 313, and the fourth GOA unit 314 are connected to different clock signal lines. Therefore, in a repeating unit, the sum of the lengths of the fourth extension section 164 and the fifth extension section 165 in different GOA units 310 is different. For example, the sum of the lengths of the fourth extension section 164 and the fifth extension section 165 in the first GOA unit 311, the second GOA unit 312, and the third GOA unit gradually decreases. The sum of the lengths of the fourth extension section 164 and the fifth extension section 165 in the fourth GOA unit 314 is greater than the sum of the lengths of the fourth extension section 164 and the fifth extension section 165 in the first GOA unit.

Referring to FIG. 7 and FIG. 15, the first gate layer 125 further includes a sixth extension section 166 and a seventh extension section 167. The sixth extension section 166 and the seventh extension section 167 extend along the second direction Y. A first end of the sixth extension section 166 is connected to the fourth gate T7G. the second end of the sixth extension section 166 is connected to the source T1S of the second inverting transistor T1 through a via hole. The first end of the seventh extension section 167 is connected to the drain T3D of the first inverting transistor T3 through a via hole. The second end of the seventh extension section 167 is connected to the gate T14G of the regulation transistor T14.

Referring to FIG. 18 and FIG. 19, the second source-drain layer 135 includes a plurality of reset signal lines RST arranged at intervals. A plurality of reset signal lines RST overlap with the first buffer unit 210. A plurality of reset signal lines RST are disposed between the first low potential line Nvgl1 and the third high potential line Pvgh2. The first end of the reset signal line RST is connected to the second branch source T9Sb in the N−10th level GOA unit 310 through the eighth via hole HL8. The second end of the reset signal line RST is connected to the gate of the first filter transistor T11 through the ninth via hole HL9.

In this embodiment, the eighth transistor penetrates through the second interlayer insulating layer 134. The ninth transistor penetrates through the third via hole HL3 through the second interlayer insulating layer 134, the first interlayer insulating layer 132, the fourth gate insulating layer 130, the third gate insulating layer 128, and the second gate insulating layer 126.

Referring to FIG. 10, the third gate layer 131 includes a third connection section 153. The third connection section 153 extends from the Nth cascaded GOA unit 310 to the N−1th cascaded GOA unit 310. Referring to FIG. 15, the first source-drain layer 133 further includes a fourth connection section 154. The first end of the fourth connection section 154 is connected to the gate of the second filter transistor T8. The second end of the fourth connection section 154 is connected to the first end of the third connection section 153. The second end of the third connection section 153 is electrically connected to the start signal line STV in the N−1th cascade GOA unit 310. The signal of the start signal line STV in the N−1th cascade GOA unit 310 comes from the first signal transmission section of the N−2th stage GOA unit 310. Therefore, the signal of the gate of the second filter transistor T8 of the present application comes from the first signal output terminal Nout of the N−2th cascade.

It should be noted that the source and drain of the above-mentioned transistors in this application are only different in name, as long as one of them is an input terminal and the other is an output terminal.

It should be noted that the film layer structure diagram provided in this application is not only applicable to the circuit structures in FIG. 3 and FIG. 5. As long as it has the same module structure as this application, that is, a module structure that outputs two kinds of gate driving signals Nout and Pout, it is applicable to this application.

The present application also provides a display terminal, which includes the above-mentioned display panel. The display terminal can be any product or component with a display function such as a mobile phone, a tablet computer, a television, a monitor, a notebook computer, a digital photo frame, a navigator, and the like.

In the foregoing embodiments, the descriptions of each embodiment have their own emphases, and for parts not described in detail in a certain embodiment, reference may be made to relevant descriptions of other embodiments.

A display panel and a display terminal provided in the embodiments of the present application have been introduced in detail above. In this paper, specific examples are used to illustrate the principles and implementation methods of the present application. The descriptions of the above embodiments are only used to help understand the technical solutions and core ideas of the present application. Those skilled in the art should understand that they can still modify the technical solutions described in the foregoing embodiments or perform equivalent replacements for some of the technical features. However, these modifications or replacements do not make the essence of the corresponding technical solutions depart from the scope of the technical solutions of the embodiments of the present application.

What is claimed is:

1. A display panel, comprising:

a display part; and a gate driving circuit, located on a side of the display part, wherein the gate driving circuit comprises:

N cascaded GOA (Gate On Array) units, disposed along a first direction; wherein each of the N cascaded GOA units comprises:

a signal generation module, a first output module, comprising:

a first buffer unit, comprising:

a first output transistor, having a first active part that is a metal oxide semiconductor;

a second buffer unit, comprising:

a second output transistor having a second active part that is a low temperature polysilicon semiconductor;

wherein the first buffer unit and the second buffer unit are disposed along a second direction, and a second output module, comprising:

a third output transistor having a third active part that is a low temperature polysilicon semiconductor;

a fourth output transistor having a fourth active part that is a low temperature polysilicon semiconductor;

wherein the signal generation module, the first output module, and the second output module are disposed along the second direction;

wherein the first output module is disposed on a side of the signal generation module close to the display part, and the first output module is configured to output a first gate driving signal;

wherein the second output module is disposed on a side of the signal generation module opposite to the side of the signal generation module close to the display part, the second output module is configured to output a second gate driving signal, and the first gate driving signal is different from the second gate driving signal;

wherein in the second direction, lengths of the first output module and the second output module are different, the second direction is parallel to scan lines of the display panel, an angle between the first direction and the second direction is greater than 0° and less than or equal to 90°, and wherein N is a positive integer;

wherein the first buffer unit is disposed close to the signal generation module, and the second buffer unit is disposed away from the signal generation module;

wherein in the second direction, a length of the first output transistor is greater than a length of the second output transistor;

wherein the third output transistor and the fourth output transistor are disposed in parallel along the first direction;

wherein a first gate of the first output transistor and a second gate of the second output transistor are connected to a first node of the signal generation module, a first source of the first output transistor is connected to a first high potential line, a first drain of the first output transistor and a second source of the second output transistor are connected to a first signal output terminal, and a second drain of the second output transistor is connected to a first low potential line; and wherein a third gate of the third output transistor is connected to a second node of the signal generation module, a third source of the third output transistor is connected to a first clock signal line, a third drain of the third output transistor and a fourth source of the fourth output transistor are connected to a second signal output terminal, a fourth gate of the fourth output transistor is connected to a third node of the signal generation module, and a fourth drain of the fourth output transistor is connected to a second high potential line.

2. The display panel according to claim 1, wherein the first output transistor further comprises a fifth gate opposite to the first gate, and the fifth gate is connected to the first node.

3. The display panel according to claim 2, wherein the display panel comprises a base substrate and an array driving layer disposed on the base substrate, and the array driving layer comprises:

a first gate layer comprising the second gate, the third gate, and the fourth gate;

wherein in the second direction, a length of the second gate is greater than a length of the third gate, and an area of the second gate is greater than an area of the third gate.

4. The display panel according to claim 3, wherein the second gate comprises a second trunk gate and a plurality of second branch gates disposed at intervals, the third gate comprises a third trunk gate and a plurality of third branch gates disposed at intervals, the second trunk gate and the third trunk gate extend along the first direction, the second branch gate and the third branch gate extend along the second direction, the fourth gate extends along the second direction, the third branch gates in the fourth gate and the third gate are disposed in parallel and at intervals;

wherein an end of the second branch gates facing the signal generation module is electrically connected to the second trunk gate, and an end of the third branch gates facing the signal generation module is electrically connected to the third trunk gate.

5. The display panel according to claim 4, wherein the display panel further comprises a first storage capacitor, a first plate of the first storage capacitor is connected to the second node, a second plate of the storage capacitor is connected to the second signal output terminal;

wherein the first gate layer further comprises the first plate, an end of the third branch gates away from the signal generation module is connected to the first plate, and in the second direction, a width of the first plate is greater than a width of the third trunk gate.

6. The display panel according to claim 4, wherein the array driving layer further comprises a second gate layer disposed on a side of the first gate layer away from the base substrate, the second gate layer comprises the first gate;

wherein the first gate comprises two first trunk gates and a plurality of first branch gates disposed between the two first trunk gates, the two first trunk gates are disposed oppositely and in parallel, the two first trunk gates extend along the first direction, the first branch gates extend along the second direction, and two ends of the first branch gates are respectively connected to the two first trunk gates.

7. The display panel according to claim 6, wherein the array driving layer further comprises a third gate layer disposed on a side of the second gate layer away from the base substrate, the third gate layer comprises the fifth gate;

wherein the fifth gate comprises two fifth trunk gates and a plurality of fifth branch gates disposed between the two fifth trunk gates, the two fifth trunk gates are disposed opposite to and parallel to each other, the two fifth trunk gates extend along the first direction, the fifth branch gates extend along the second direction, and two ends of the fifth branch gates are respectively connected to the two first trunk gates.

8. The display panel according to claim 7, wherein the array driving layer further comprises a first active layer disposed between the first gate layer and the base substrate, and the first active layer comprises a low temperature polysilicon semiconductor;

wherein the first active layer comprises the second active part, the third active part, and the fourth active part, the second active part overlaps with the second branch gates, the third active part overlaps with the third branch gates; the second active part comprises two second sub-active parts disposed at intervals, the third active part comprises two third sub-active parts disposed at intervals, the second sub-active part and the third sub-active part extend along the first direction, the fourth active part comprises two fourth sub-active parts disposed at intervals, and the two fourth sub-active parts overlap with the fourth gate; and wherein in the second direction, a width of the second sub-active part is larger than a width of the third sub-active part, a width of the fourth sub-active part is equal to the width of the third sub-active part, and the fourth sub-active part is connected to a corresponding third sub-active part.

9. The display panel according to claim 8, wherein the array driving layer further comprises a second active layer disposed between the third gate layer and the second gate layer, and the second active layer comprises a metal oxide semiconductor;

wherein the second active layer comprises the first active part, the first active part comprises two first sub-active parts disposed at intervals, the first sub-active part extends along the first direction, and the two first sub-active parts overlap with the first branch gates.

10. The display panel according to claim 9, wherein the array driving layer further comprises a first source-drain layer disposed on a side of the third gate layer away from the second gate layer, the first source-drain layer comprises the first source, the first drain, the second source, and the second drain;

wherein the first source comprises a first trunk source and a plurality of first branch sources disposed at intervals and in parallel, the first drain comprises a plurality of first branch drains, the first trunk source extends along the first direction, the first branch source extends along the second direction, a side of the first branch sources away from the signal generation module is connected to the first trunk source, the first branch drains extend along the second direction, and the first branch drains are disposed between the first branch sources; and wherein the second drain comprises a second trunk drain and a plurality of second branch drains disposed at intervals and in parallel, the second source comprises a plurality of second branch sources, the second trunk drain extends along the first direction, the second branch drain extends along the second direction, a side of the second branch drains close to the signal generation module is connected to the second trunk drain, the second branch sources extend along the second direction, the second branch sources are disposed between the second branch drains, and the first trunk source is connected to the second trunk drain.

11. The display panel according to claim 10, wherein the first source-drain layer further comprises a first connection section, the first connection section is disposed between an end of the second branch source close to the signal generation module and the second trunk drain;

wherein the third gate layer further comprises a first protrusion part disposed on a side of the fifth trunk gate away from the signal generation module, the first protrusion is connected to the fifth trunk gate, and the first protrusion part extends to a side away from the signal generation module;

wherein a first end of the first connection section overlaps with the first protrusion part and the second trunk gate, a second end of the first connection section overlaps with the second trunk gate, the first connection section is electrically connected to the first protrusion part, and the second end of the first connection section is electrically connected to the second trunk gate.

12. The display panel according to claim 11, wherein the first source-drain layer further comprises a second connection section, the second connection section is disposed on a side of the first branch drain close to the signal generation module;

wherein the second gate layer further comprises a second protrusion part disposed on a side close to the signal generation module, the second protrusion part is connected to the first trunk gate, and the second protrusion part extends to a side close to the signal generation module;

wherein the third gate layer further comprises a third protrusion part disposed on a side close to the signal generation module, the third protrusion part is connected to the fifth trunk gate, and the third protrusion part extends to a side close to the signal generation module;

wherein a first end of the second connection section overlaps with the second protrusion part, a second end of the second connection section overlaps with the third protrusion part, the first end of the second connection section is electrically connected to the third protrusion part, and the second end of the second connection section is electrically connected to the fourth protrusion part.

13. The display panel according to claim 11, wherein the first source-drain layer further comprises a third source, a third drain, a fourth source, and a fourth drain;

wherein the third source comprises a third trunk source and two third branch sources disposed in parallel and spaced apart, an end of the two third branch sources close to the signal generation module is connected to the third trunk source, the third drain comprises a third trunk drain and two third branch drains disposed in parallel and spaced apart, an end of the two third branch drains close to the signal generation module is connected to the third trunk drain, and the two third branch sources and the two third branch drains are alternately disposed in the first direction;

wherein the fourth source and the fourth drain extend along the second direction, the fourth drain is disposed adjacent to the third branch drain, the fourth source is disposed on a side of the fourth drain away from the third branch drain, and a first end of the fourth source is connected to the third trunk drain.

14. The display panel according to claim 13, wherein the first source-drain layer further comprises a first extension section connected to the third source, the first extension section extends along the second direction, and the first extension section is located in an area where the signal generation module is located;

wherein the gate driving circuit comprises a plurality of repeating units, each of the repeating units comprises at least four of the N cascaded GOA units, and in the repeating units, lengths of the first extension sections in a part of the N cascaded GOA units in the first direction are different.

15. The display panel according to claim 13, wherein the array driving layer further comprises a second source-drain layer disposed on a side of the first source-drain layer away from the base substrate, the second source-drain layer comprises the first high potential line, the first low potential line, and the second high potential line, and the first high potential line, the first low potential line, and the second high potential line are disposed in parallel and all extend along the first direction;

wherein the first high potential line overlaps with the second branch sources and the second branch drains in each of the N cascaded GOA units, and the first high potential line is electrically connected to the second branch sources in each of the N cascaded GOA units;

wherein the first low potential line overlaps with the first branch sources and the first branch drains in each of the N cascaded GOA units, and the first low potential line is electrically connected to the first branch drains in each of the N cascaded GOA units; and wherein the second high potential line overlaps the third sub-active part and the fourth sub-active part on a side close to the signal generation module, in the second direction, a width of the first high potential line is equal to a width of the first low potential line, and a width of the first high potential line is greater than a width of the second high potential line.

16. The display panel according to claim 1, wherein the signal generation module comprises:

a cascade signal selection module electrically connected between a start signal line and a fourth node;

a pull-up control module configured to control a potential of the first node according to a potential of the fourth node and a potential of the second clock signal line;

a first filter module electrically connected between a fifth node and the first node, wherein a control terminal of the first filter module is electrically connected to a reset signal line;

a second filter module electrically connected between the fifth node and the second node, wherein the control terminal of the second filter module receives the first gate driving signal of a N−2th cascade;

a first inverting module connected between the first node and the third node;

a feedback module connected between the first node and the third node; and a voltage regulation module, wherein a first end of the voltage regulation module is electrically connected to the first low potential line, a second end of the voltage regulation module is connected to a gate of the first output transistor, and a control terminal of the voltage regulation module is electrically connected to the third node.

17. The display panel according to claim 1, wherein the first gate driving signal is a positive pulse signal, and the second gate driving signal is a negative pulse signal;

wherein within a time interval of one frame, the first signal output terminal outputs two positive pulse signals, and the second signal output terminal outputs one negative pulse signal.

* * * * *